US006731338B1

(12) United States Patent
Lin

(10) Patent No.: US 6,731,338 B1
(45) Date of Patent: May 4, 2004

(54) REDUCING DISCONTINUITIES IN SEGMENTED SSAS

(75) Inventor: Denny M. Lin, Fountain Valley, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/479,662

(22) Filed: Jan. 10, 2000

(51) Int. Cl.$^7$ .............................. H04N 3/14; H04N 5/335
(52) U.S. Cl. ..................... 348/323; 348/218.1; 348/294
(58) Field of Search .................. 348/218.1, 262, 348/316, 321, 323, 36, 294, 252, 308; 358/450, 514; 382/294, 268, 162, 164

(56) References Cited

U.S. PATENT DOCUMENTS

| | | | |
|---|---|---|---|
| 4,598,321 A | 7/1986 | Elabd et al. ................. 358/213 |
| 4,665,440 A | 5/1987 | Tromborg ............... 358/213.29 |
| 4,692,812 A | 9/1987 | Hirahara et al. ............ 358/285 |
| 4,797,942 A | 1/1989 | Burt ............................. 382/41 |
| 4,821,103 A | 4/1989 | Busby ................... 358/213.26 |
| 5,047,858 A | 9/1991 | Aimonoya ................. 358/183 |
| 5,159,455 A | 10/1992 | Cox et al. ................... 358/213 |
| 5,210,614 A | 5/1993 | Kannegundla et al. . 358/213.28 |
| 5,379,067 A | 1/1995 | Miura ......................... 348/311 |
| 5,432,551 A | 7/1995 | Matsunaga .................. 348/299 |
| 5,477,264 A | 12/1995 | Sarbadhikari et al. ...... 348/231 |
| 5,572,037 A | 11/1996 | Liu et al. .................. 250/483.1 |
| 5,598,261 A | 1/1997 | Duncan et al. ............. 356/121 |
| 5,606,707 A | 2/1997 | Tomassi et al. ............. 395/800 |
| 5,634,067 A | 5/1997 | Nagazumi ................... 395/800 |
| 5,764,288 A | 6/1998 | Gorelik ....................... 348/311 |
| 5,805,216 A | 9/1998 | Tabei et al. ................. 348/246 |
| 5,834,782 A | 11/1998 | Schick et al. .......... 250/370.11 |
| 5,896,172 A * | 4/1999 | Korthout et al. ............ 348/248 |
| 6,337,713 B1 * | 1/2002 | Sato ........................... 348/311 |
| 6,571,022 B2 * | 5/2003 | Okisu et al. ................. 382/294 |

OTHER PUBLICATIONS

U.S. Statutory Invention Reg. No. H1617, Fuller, Jr., Dec. 1996.
"The mK × nK Image sensor, a modular CCD.", Philips Imaging Technology, 1995.

* cited by examiner

*Primary Examiner*—Wendy R. Garber
*Assistant Examiner*—Matthew L Rosendale
(74) *Attorney, Agent, or Firm*—Fitzpatrick, Cella, Harper & Scinto

(57) ABSTRACT

Color-correcting data from a segmented imaging sensor having plural sensor segments. The data is stored in plural segment memories each of which corresponds to one of the sensor segments, and each segment memory stores overlap data and non-overlap data from the corresponding sensor segment. The overlap data in each segment memory includes boundary data from a boundary region of the sensor segment for which color correction is performed based at least in part on data from a segment memory for an adjacent sensor segment. The overlap data further includes other data from the segment memory used to color-correct the boundary data. According to the invention, overlap data from at least a first half of the segment memories is loaded into a memory buffer. Alternatively, boundary data from all of the segment memories and non-boundary overlap data from a first half of the segment memories are loaded into the memory buffer, or boundary data from all of the segment memories is loaded into the memory buffer. Boundary and/or overlap data from the memory buffer is combined with data from some or all of the segment memories. Color correction is performed of boundary data based on the combined data, and color correction is performed of non-boundary data for each of the segment memories.

35 Claims, 21 Drawing Sheets

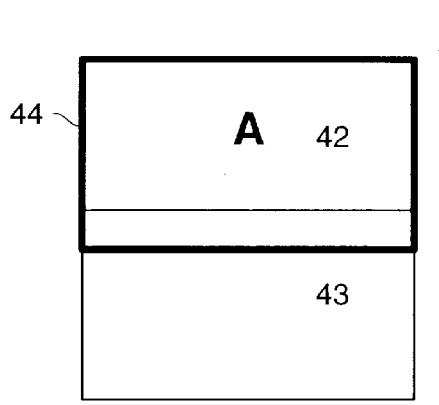
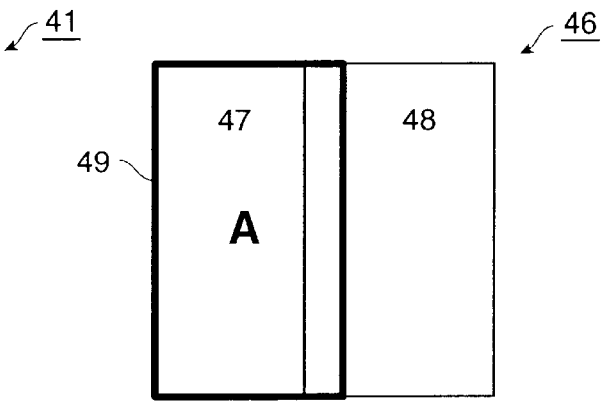
2-QUADRANT (HORIZONTAL)
FIG. 2A
2-QUADRANT (VERTICAL)
FIG. 2B
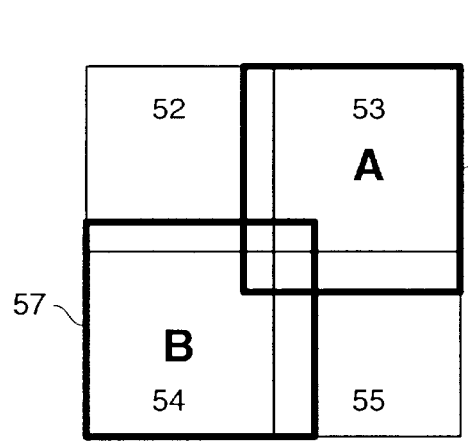
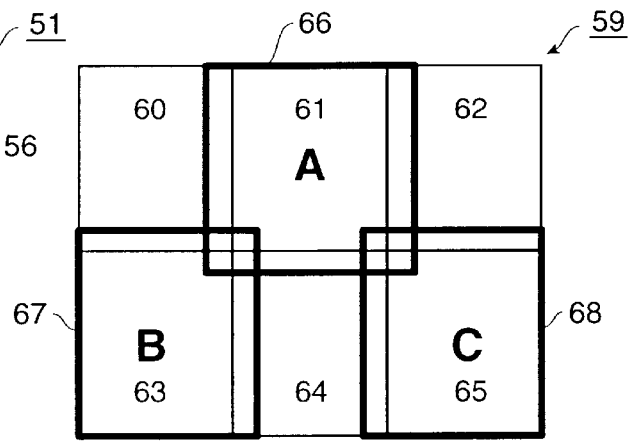
4-QUADRANT
FIG. 2C
6-QUADRANT
FIG. 2D
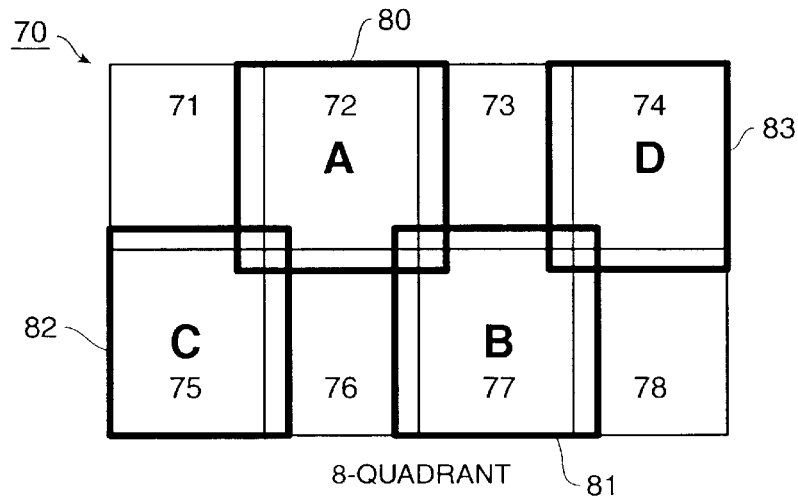
8-QUADRANT
FIG. 2E

REDUCING DISCONTINUITIES IN SEGMENTED SSAS

BACKGROUND OF THE INVENTION

1. Field of the Invention

The invention concerns processing of data from segmented imaging sensors such as segmented solid-state sensor arrays (SSAs). In particular, the invention concerns processing of such data by a media processor which includes a built-in memory buffer for storing overlap data needed to color-correct data from boundary regions of sensor segments which are adjacent to other sensor segments. The media processor also includes direct memory access for efficiently accessing the built-in memory buffer.

2. Description of the Related Art

Recent advances in manufacturing processes for imaging sensors such as SSAs have resulted in imaging sensors having many millions of pixels arranged in a two-dimensional array. Because of the large number of pixels, however, there has been an undesirable increase in the processing time needed merely to shift out the data from the imaging sensors.

Several proposals have been considered to address the increase in shift-out time. According to one such proposal, an imaging sensor, such as a solid-state sensor array, is segmented into plural different disjoint areas, such as being divided into halves, fourths, or sixths. Data is output from each segment of the SSA separately. As a consequence of this arrangement, it is possible to reduce the shift-out time in proportion to the number of segments. For example, when an imaging sensor is divided into mutually disjoint left and right halves, it is possible to reduce the shift-out time by a factor of two.

One problem encountered during image reconstruction when using a segmented SSA is the appearance of discontinuities in image data formed at boundaries between each of the segments. If data from each sensor segment is processed separately, for example to perform color correction, these discontinuities can be exacerbated. However, in order to maintain processing efficiency, it is preferable to separately process data from plural segments in parallel.

SUMMARY OF THE INVENTION

It is an object of the invention to reduce discontinuities at boundaries between segments of a segmented imaging sensor while allowing efficient processing of data from plural sensor segments. To this end, a media processor according to the invention includes a memory buffer for storing data used to process image data from portions of the sensor segments adjacent to boundaries between segments. Such processing of the image data can include color correction and data compression, as well as other functions. For example, the data from this memory buffer is combined with data from various ones of the sensor segments, and the combined data is color-corrected. Preferably, the media processor includes plural processing clusters. A processing cluster is comprised of at least one logic unit and one data loading unit together with associated register files. These processing clusters can process the combined data in parallel, thereby improving processing efficiency.

Accordingly, in one aspect the invention is a media processor for processing data from a segmented imaging sensor having plural sensor segments. The data is stored in plural segment memories each of which corresponds to one of the sensor segments. The plural segment memories are provided in one large memory bank, thereby storing data in several different memory locations. Each segment memory also stores overlap data as well as non-overlap data from the corresponding sensor segment. The overlap data in each segment memory includes boundary data from a boundary region of the sensor segment for which color correction is performed based at least in part on data from a segment memory for an adjacent sensor segment. The overlap data further includes other data from the segment memory used to color-correct the boundary data.

The media processor according to the invention includes an interface to data from the plural segment memories, a memory buffer for storing boundary or other overlap data from at least one of the segment memories, and a data transfer controller for direct memory access to the memory buffer. The data transfer controller acts as an input/output (I/O) processor and has to manage data flow efficiently. Also included are control logic and one or more processing clusters for performing color correction on data, thereby providing the capability of processing data from multiple segment memories in parallel. Preferably, each processing cluster is capable of processing very long instruction word (VLIW) commands.

By virtue of the foregoing arrangement, data necessary for color correction of boundary data can be directly accessed from the memory buffer. This data can be combined with other data from the segment memories, and the data can be processed in parallel by plural processing clusters. Thus, discontinuities are alleviated, and processing efficiency can be improved.

The preferred embodiment of the media processor includes an interface to an image memory for storing color-corrected image data for all of the sensor segments. The color-corrected image data is preferably combined to produce an image indicative of the object to which the segmented image sensor was exposed.

In another aspect, the present invention is a method for color-correcting data from a segmented imaging sensor having plural sensor segments. The method preferably is implemented through control logic of a media processor as described above.

According to one embodiment of the method, overlap data is loaded from at least a first half of the segment memories into a memory buffer. The overlap data from the memory buffer is combined with data from a second half of the segment memories. Color correction is performed of boundary data, based on the combined data, and of non-boundary data for each of the segment memories. The color correction preferably is performed in parallel for plural segment memories, for example by plural processing clusters.

Preferably, color-corrected boundary data is loaded back into the memory buffer, and color-corrected non-boundary data from the first half of the segment memories is combined with color-corrected boundary data from the memory buffer. Preferably, the non-corrected data is trimmed away. The color-corrected boundary data and non-boundary data preferably are output from each of the segment memories.

According to another embodiment of the method, boundary data from all of the segment memories and non-boundary overlap data from a first half of the segment memories are loaded into a memory buffer. Boundary data from the memory buffer is combined with data from a specific segment memory which is adjacent to a second half of the segment memories. Non-boundary overlap data from the memory buffer is combined with data from a second half of the segment memories. Color correction is performed of boundary data, based on the combined data, and of non-boundary data for each of the segment memories.

Preferably, color-corrected boundary data is loaded back into the memory buffer, and color-corrected non-boundary data from the segment memories is combined with color-corrected boundary data from the memory buffer. Preferably, non-corrected data is trimmed away. The color-corrected boundary data and non-boundary data preferably are output from each of the segment memories.

According to yet another embodiment of the method, boundary data from all of the segment memories is loaded into the memory buffer. Data from the memory buffer is combined with data from each of the segment memories. Color correction is performed of boundary data, based on the combined data, and of non-boundary data for each of the segment memories. Preferably, non-corrected data is trimmed away, and color-corrected boundary data and non-boundary data are output from each of the segment memories.

According to a further embodiment of the method, data from all of the segment memories and non-boundary overlap data from a first half of the segment memories are loaded into a memory buffer. Color correction is performed on the combined data by multiple processing clusters, preferably in parallel. Color-corrected boundary data from the first half of the segment memories is loaded back into the memory buffer and is combined with color-corrected data from a second half of the segment memories. This combined data is then color-corrected. Preferably, non-corrected data is trimmed away. The color-corrected boundary data and non-boundary data are output from each of the segment memories.

Each of the foregoing embodiments facilitates access to data needed to color-correct data from each of plural sensor segments, thereby alleviating discontinuities and improving processing efficiency. Preferably, each of the foregoing embodiments includes combining the corrected data from each of the segment memories to produce an image which is indicative of the object to which the segmented image sensor was exposed.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIGS. 2A to 2E are representational views for explaining color correction of boundary pixels according to the invention.

DETAILED DESCRIPTION OF THE PREFERRED EMBODIMENTS

Figure 1A:
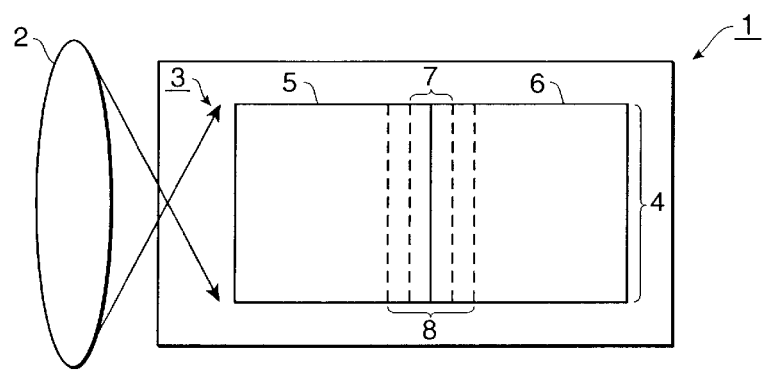
FIGS. 1A to 1C are representational views of segmented imaging sensor devices according to the invention.
Figure 1B:
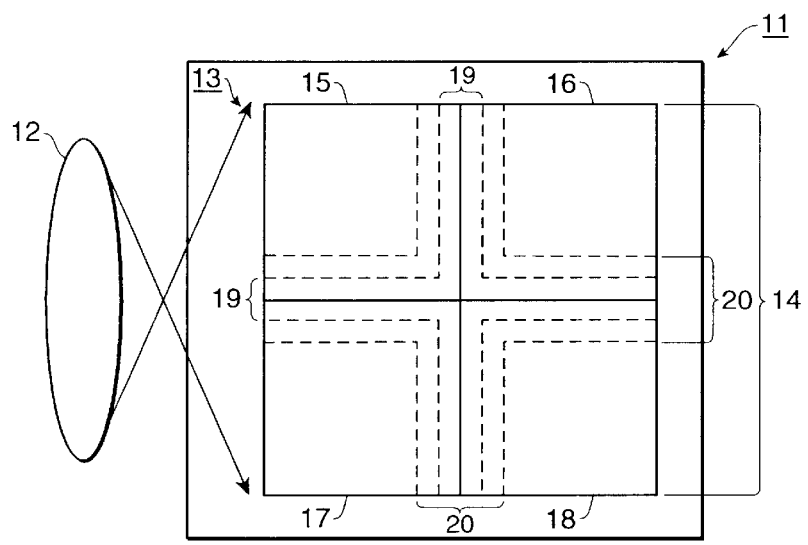
Figure 1C:
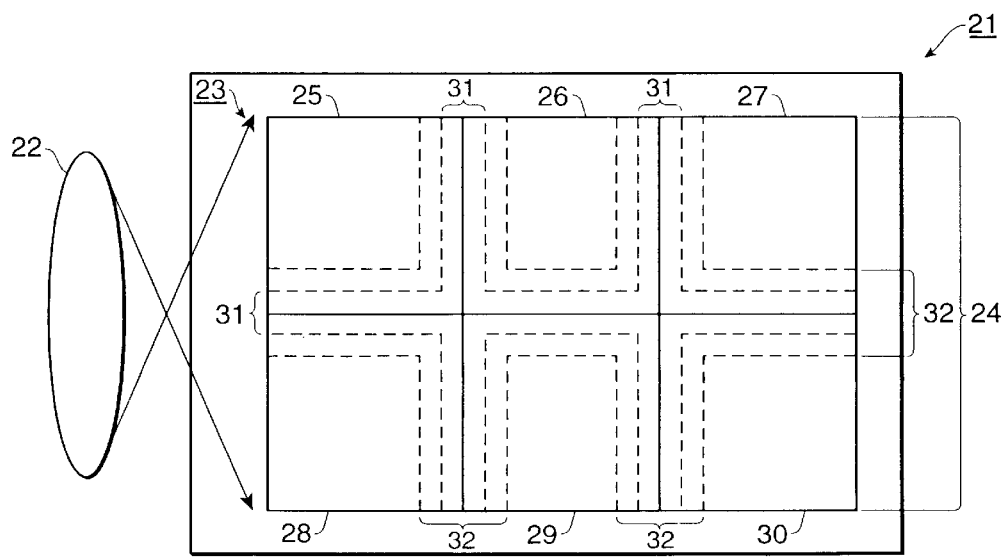

FIGS. 1A to 1C are representational views of segmented imaging sensor devices according to the invention.

Shown in FIG. 1A is electronic imaging sensor chip 1, such as a solid-state sensor array (SSA) chip, along with lens system 2 for focusing incident light for an image onto sensor array 3 in unmasked area 4 of sensor chip 1. Sensor array 3 includes two mutually-disjoint sensor segments. As shown in FIG. 1A, these sensor segments include segment 5 and segment 6. It can be appreciated that the electronic imaging sensor can be provided in a device other than a single chip.

Each sensor segment preferably includes a plurality of rows of photosensitive cells. Each cell preferably corresponds to a pixel of image data generated by sensor chip 1. When light strikes one of these cells, the light generates a charge or voltage in the cell for the corresponding pixel.

After the light has generated these charges or voltages for a predetermined period of time corresponding to a single image, the charges or voltages are shifted out of each sensor segment so as to provide image data for the image focused onto sensor array 3. Preferably, the charges or voltages are shifted out of each segment row by row. Preferably, the disjoint sensor segments operate in parallel.

The sensor segments preferably are shuttered, either physically or electronically, so that no more charges or voltages are generated by incident light during the shifting operation. This shuttering tends to prevent or diminish image smearing that could occur from charges or voltages generated by instant light as the charges or voltages are shifted out of the sensor segments.

Preferably, three phased clocks (not shown) are provided for shifting the charges or voltages out of each sensor segment using techniques that are known in the art. Each of the phased clocks preferably has a one-third duty cycle and is offset from the other clocks. By successively clocking cells in a sensor segment using these clocks, the charges or voltages are shifted out of the segment. Preferably, the charges or voltages are shifted one row at a time into segment memories, as explained below in more detail with reference to FIGS. 3 to 9 and 13 to 17.

Data generated by sensor segments 5 and 6 may include discontinuities formed at the boundary between the sensor segments. In particular, boundary data for boundary region 7 of sensor segments 5 and 6 might include such discontinuities. In order to reduce these discontinuities, a media processor according to the invention color-corrects this boundary data based on boundary and/or other overlap data from overlap region 8 of sensor segments 5 and 6.

As shown in FIG. 1A, overlap data includes all boundary data, but boundary data does not necessarily include all overlap data. Thus, overlap data from overlap region 8 includes all boundary data from boundary region 7 for both sensor segments 5 and 6, as well as non-boundary data from the sensor segments.

In alternative embodiments of the invention, the relationship between the overlap data and the boundary data might be different from that shown in FIG. 1A. In any event, the boundary data is data for which color correction is performed based at least in part on data from one or more adjacent sensor segments, and the overlap data includes data which is used to perform color correction for at least one data value of the boundary data.

Color correction of any one pixel typically is performed based on data values for a predefined number of adjacent pixels. For example, data for any given pixel can be color-corrected based on data values for every adjacent pixel, thereby requiring data for a 3×3 matrix of pixels. For pixels in boundary region 7 of one sensor segment, color correction is based at least in part on data from the other sensor segment. Thus, color correction for boundary data from within boundary region 7 of sensor segment 5 might be based on boundary data from boundary region 7 of sensor segment 6, as well as overlap data (including boundary data) from overlap region 8 of sensor segment 5. If more than a 3×3 matrix of pixels is utilized, color correction for boundary data from within boundary region 7 of sensor segment 5 might also be based on non-boundary overlap data from overlap region 8 of sensor segment 6 outside of boundary region 7.

FIG. 1B shows an electronic imaging sensor chip constructed along the lines of sensor chip 1 in FIG. 1A, except that electronic imaging sensor chip 11 includes four disjoint sensor segments. Thus, shown in FIG. 1B is sensor chip 11 along with lens system 12 for focusing incident light for an image onto sensor array 13 in unmasked area 14 of sensor chip 11. Sensor array 13 includes four mutually-disjoint sensor segments 15, 16, 17 and 18. It can be appreciated that this electronic imaging sensor can be provided in a device other than a single chip.

In order to reduce discontinuities in image data corresponding to the disjoint sensor segments, data from boundary region 19 is color-corrected according to the invention based on data from overlap region 20. Boundary data from any one sensor segment is corrected based on data from one or more adjacent sensor segments.

In FIG. 1B, the boundary and overlap regions form a cross shape. In the center of this cross shape, color correction for a pixel in boundary region 19 in one sensor segment might require data from each of the other three adjoining sensor segments. Color correction according to the invention allows for efficient color correction even in this situation, where data from all four sensor segments must be combined, as discussed in more detail with reference to FIGS. 3, 4, 10 to 12 and 18.

Electronic imaging sensor chip 21, illustrated in FIG. 1C, is constructed along the lines of sensor chips 1 and 11, except that sensor chip 21 includes six mutually-disjoint sensor segments. Thus, shown in FIG. 1C is electronic imaging sensor chip 21 along with lens system 22 for focusing incident light for an image onto sensor array 23 in unmasked region 24 of sensor chip 21. Sensor array 23 includes six mutually-disjoint sensor segments 25, 26, 27, 28, 29 and 30. It can be appreciated that this electronic imaging sensor can be provided in a device other than a single chip.

In order to color-correct data from boundary region 31 of the sensor segments, data from overlap region 32 of the sensor segments is utilized. For example, in order to correct color data from boundary region 31 of sensor segment 26, overlap data from sensor segment 26 and boundary and/or other overlap data from sensor segments 25, 27, 28, 29 and 30 is utilized. Color correction according to the invention for a six-segment imaging sensor is explained in more detail below with reference to FIGS. 19 and 20.

The structure of electronic imaging sensor 21 can be expanded to any 2×N-sized electronic imaging sensor. The arrangement of overlap and boundary data for any one sensor segment will match that of one of sensor segments 25 through 30 shown in FIG. 1C. For example, for an imaging sensor with eight sensor segments in a 2×4 arrangement, the corner sensor segments will be arranged along the lines of sensor segments 25, 27, 28 and 30, and the center sensor segments will be arranged along the lines of sensor segments 26 and 29. Thus, the specific details of color correction according to the invention described hereinbelow are directly applicable to any electronic imaging sensor having disjoint sensor segments arranged in a 2×N array. Furthermore, the teachings of the invention are applicable to other sensor arrangements, in which color correction of data from one sensor segment is based at least in part on data from adjacent sensor segments.

FIGS. 2A through 2E are representational views for explaining color correction of boundary data according to one embodiment of the invention. In FIG. 2A, imaging sensor 41 includes sensor segments 42 and 43 separated by a horizontal boundary. In order to color-correct boundary pixels in sensor segments 42 and 43, some or all of overlap data from sensor segment 43 is combined with data from sensor segment 42, as indicated by box 44. Then, color correction can be performed on data from sensor segments 42 and 43, and the color-corrected boundary data can be recombined with data from sensor segment 43.

Likewise, FIG. 2B shows imaging sensor 46 which includes sensor segments 47 and 48. Sensor segments 47 and 48 are separated by a vertical boundary. In order to color-correct boundary data for sensor segments 47 and 48, some or all of overlap data from sensor segment 48 is combined with data from sensor segment 47, as indicated by box 49. Then, data for both sensor segments 47 and 48 can be color-corrected, and the corrected boundary data for sensor segment 48 can be recombined with other data from sensor segment 48.

FIG. 2C shows a four-quadrant imaging sensor 51. Imaging sensor 51 includes sensor segments 52, 53, 54 and 55. In order to color-correct boundary data from sensor segments 52 to 55, some or all of overlap data from sensor segments 52 and 55 is combined with data from sensor segments 53 and 54. In addition, overlap data from sensor segment 53 is combined with data from sensor segment 54, and overlap data from sensor segment 54 is combined with data from sensor segment 53. These combinations are indicated by boxes 56 and 57 in FIG. 2C. Then, color correction can be performed on the data, and the color-corrected boundary data can be recombined with the other data from the corresponding sensor segments.

FIG. 2D illustrates the combination of overlap data for six-segment imaging sensor 59. Imaging sensor 59 includes sensor segments 60, 61, 62, 63, 64 and 65. Box 66 shows some or all of overlap data from each of sensor segments 60, 62, 63, 64 and 65 combined with data from sensor segment 61, thereby allowing for correction of boundary data contained within box 66. Likewise, box 67 shows data from sensor segment 63 combined with some or all of overlap data from sensor segment 60, 61 and 64, and box 68 shows data from sensor segment 65 combined with some or all of overlap data from sensor segments 61, 62 and 64. Then, color correction can be performed on the data, and the color-corrected boundary data can be recombined with the other data from the corresponding sensor segments.

As discussed above with reference to FIG. 1C, any arbitrarily-large 2×N imaging sensor can be constructed from sensor segments analogous to those in a six-segment imaging sensor. Thus, imaging sensor 70 includes sensor segments 71, 72, 73, 74, 75, 76, 77 and 78. Color correction for central sensor segments 72, 73, 76 and 77 can be performed in a manner similar to color correction for sensor segments 61 and 64 shown in FIG. 2D.

Thus, box 80 shows that color correction around a boundary of sensor segment 72 is performed based on data from surrounding sensor segments 71, 73, 75, 76 and 77. Likewise, color correction around a boundary of sensor segment 77 is performed based on data from sensor segments 72, 73, 74, 76 and 78.

Color correction for sensor segments on the ends of imaging sensor 70 are performed in a manner analogous to color correction for the ends of six-segment imaging sensor 59 shown in FIG. 2D. Thus, as shown by box 82 in FIG. 2E, color correction around a boundary of sensor segment 75 is performed based on data from sensor segments 71, 72 and 76. Likewise, color correction around a boundary of sensor segment 74 is performed based on data from sensor segments 73, 77 and 78, as shown by box 83.

Of course, other arrangements and combinations of data in FIGS. 2A through 2E can be utilized for color correction according to the invention.

Figure 3:
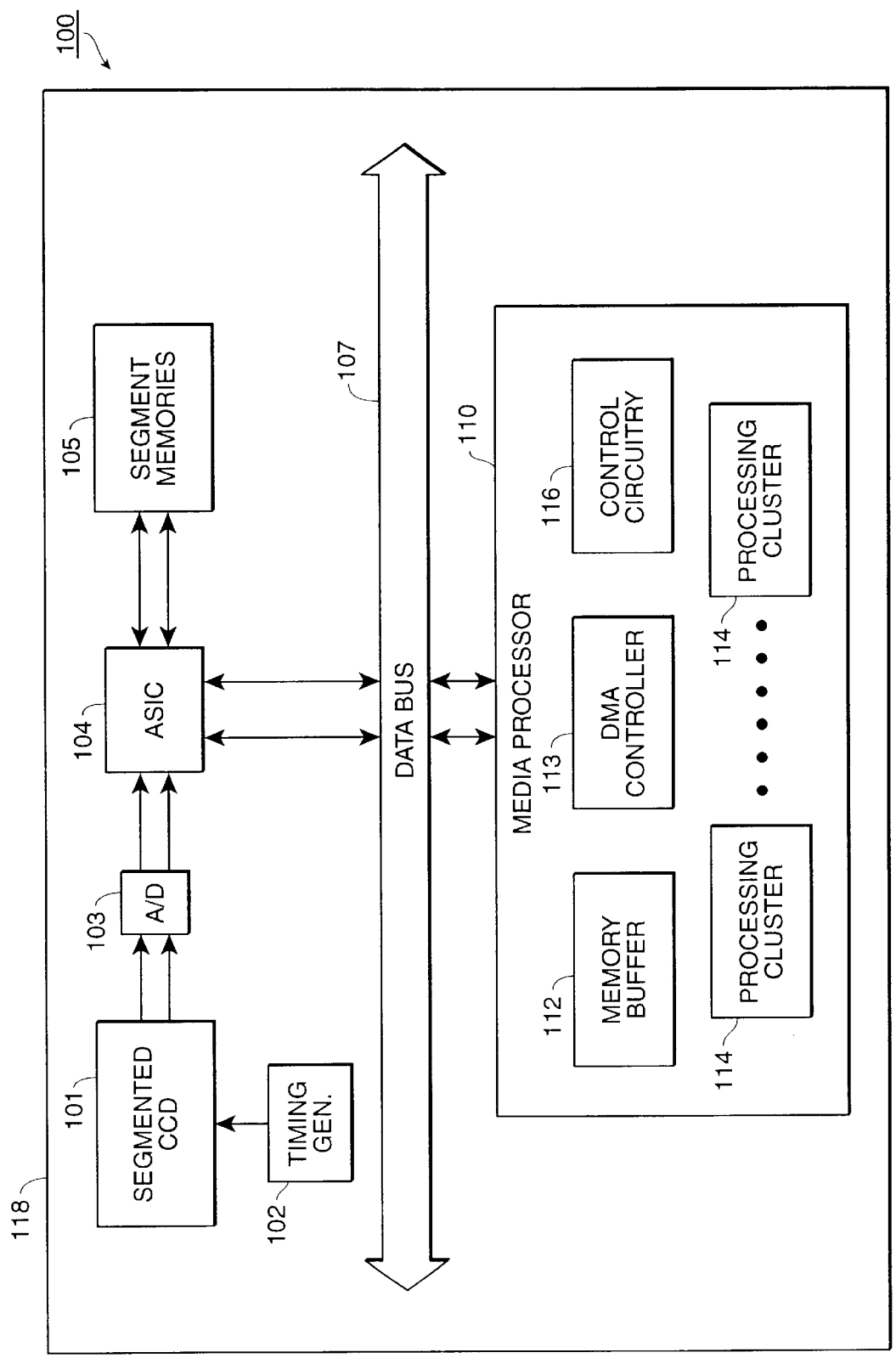
FIG. 3 is a block diagram of an image processing system including a media processor according to the invention.

FIG. 3 is a block diagram of an image processing system including a media processor according to the invention. Briefly, according to the invention, a media processor performs color correction of data from a segmented imaging sensor having plural sensor segments. The data is stored in plural segment memories each of which preferably corresponds to one of the sensor segments. Each segment memory stores overlap data and non-overlap data from the corresponding sensor segment. The overlap data in each segment memory includes boundary data from a boundary region of the sensor segment for which color correction is performed based at least in part on data from a segment memory for an adjacent sensor segment. The overlap data further includes other data from the segment memory used to color-correct the boundary data. The media processor according to the invention includes an interface to data from the plural segment memories, a memory buffer for storing overlap data from at least one of the segment memories, and a direct data transfer controller for direct memory access to the memory buffer. Also included are control logic and one or more processing cluster(s) for performing color correction on the data. Preferably, each processing cluster is capable of processing very long instruction word (VLIW) commands. The VLIW commands enable several functions to be performed by several processing clusters in parallel.

In more detail, shown in FIG. 3 is image processing system 100 for processing image data generated by an imaging sensor. In FIG. 3, the imaging sensor is segmented SSA 101; however, the invention is equally applicable to other types of segmented imaging sensors. Examples of the arrangements of segments for segmented imaging sensors are given in the foregoing descriptions of FIGS. 1A through 1C and 2A through 2E.

Timing generator 102 generates timing signals, preferably in the form of outputs from three phased clocks, for shifting charges or voltages out of each sensor segment of segmented SSA 101. These charges or voltages are converted into digital signals by A/D converter 103.

The digital signals representing image data from sensor segments of segmented SSA 101 preferably are directed by ASIC 104 to segment memories 105. Segment memories 105 can be provided on a single memory chip with segmented memory arrays or on one memory chip for each segment memory. In the preferred embodiment, the number of segment memories in segment memories 105 matches the number of sensor segments in segmented SSA 101.

Besides providing an interface between A/D converter 103 and segment memories 105, ASIC 104 provides an interface to data bus 107. Data bus 107 in turn is connected to media processor 110 according to the invention.

Media processor 110 preferably includes memory buffer 112 for storing boundary or other overlap data loaded from segment memories 105. Memory buffer 112 is utilized to accumulate image data before color-correction can be executed. Media processor 110 also preferably includes data transfer controller 113 for providing direct memory access to memory buffer 112 by processing clusters 114. Preferably, all access to the memory buffer 112 and segment memories 105 is through data transfer controller 113.

Each processing cluster preferably is capable of performing color correction of image data. Thus, plural color correction operations can be performed in parallel, thereby resulting in efficient processing of image data. In the preferred embodiment, the processing clusters are capable of processing very long instruction word (VLIW) commands, thereby facilitating rapid processing of data.

Also provided in the preferred embodiment of media processor 110 is control circuitry 116. This control circuitry controls loading, combining, processing and outputting of data, as explained in more detail below with respect to FIGS. 4 through 20. Control logic 116 can be constructed from any type of control circuitry, including but not limited to hard-wired logic and programmable logic. If control logic 116 is programmable, then media processor 110 preferably includes either memory (not shown) for storing a program or an interface to memory or some other storage medium for storing the program.

Imaging system 100 can be incorporated onto a single image processing chip, as illustrated by box 118 in FIG. 3. Alternatively, the various elements of image processing system 100 can be embodied in separate chips, which are then connected using techniques well known in the art.

Figure 4:
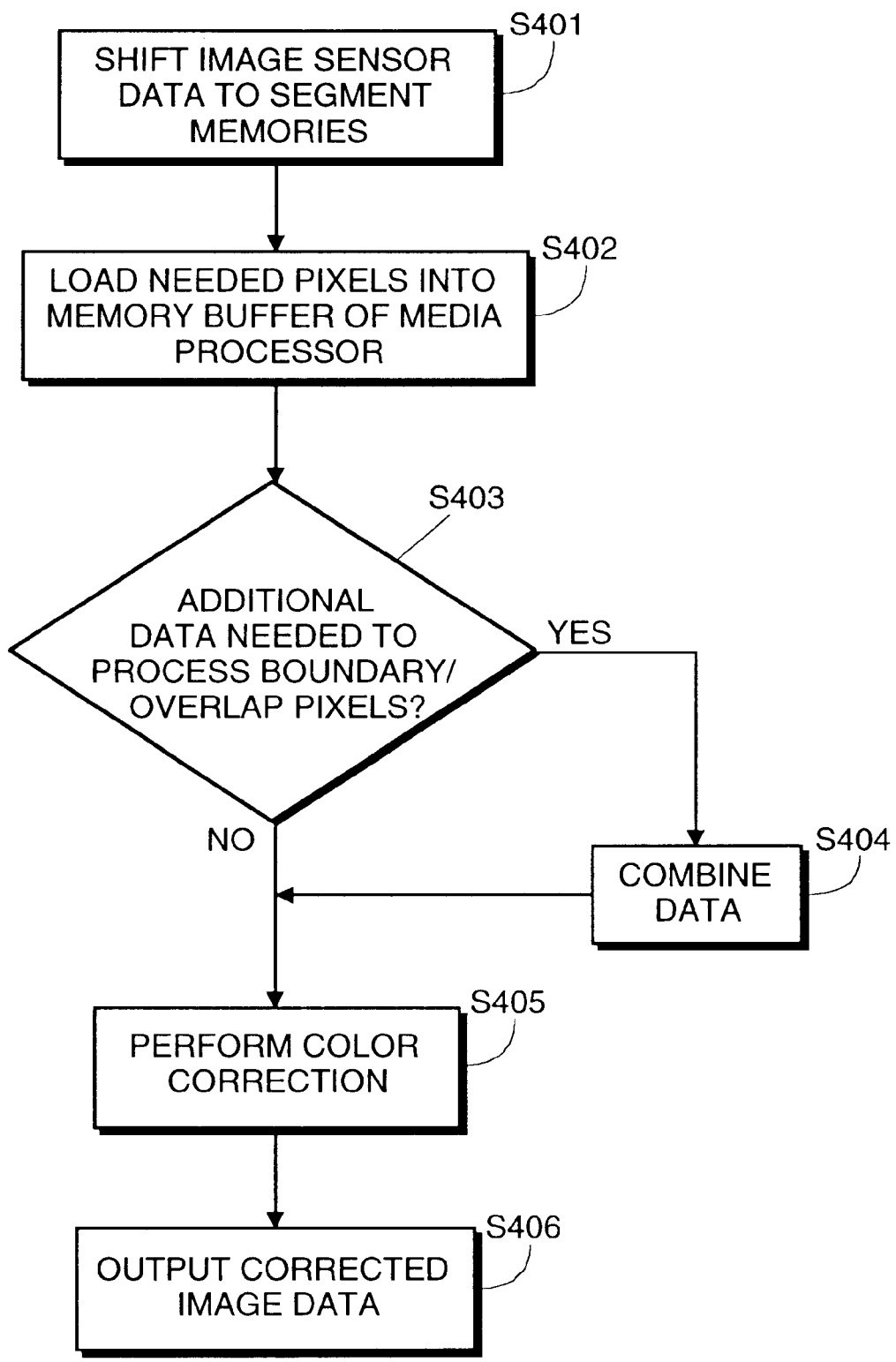
FIG. 4 is a flowchart for describing color correction of image data from plural sensor segments utilizing a media processor according to the invention.

FIG. 4 is a flowchart for describing color correction of image data from plural sensor segments utilizing a media processor according to the invention.

In step S401, image data generated by segmented SSA 101 is shifted into segment memories 105. In more detail, charges are shifted out of segmented SSA 101 by timing generator 102, through A/D converter 103 and ASIC 104, to segment memories 105.

In step S402, data needed for color correction according to the invention of boundary data from segmented SSA 101 is loaded into memory buffer 112 of media processor 110. Control circuitry 116 controls access to data from segment memories 105 through ASIC 104 via data bus 107. Control circuitry 116 also preferably controls loading of the data to memory buffer 112 through data transfer controller 113. Different data is loaded into memory buffer 112 in various different embodiments of the invention, as explained in detail below with reference to FIGS. 5 through 20.

In step S403, control circuitry 116 determines whether or not additional data is needed to color-correct boundary pixels for a particular segment memory. If additional data is needed, that data is combined with data from the segment memory in step S404. Again, in different embodiments of the invention, different combinations of data are utilized. These different combinations are explained in detail below with reference to FIGS. 5 through 20.

If additional data is not needed to perform color correction, flow proceeds from step S403 to step S405 without passing through step S404. In step S405, color correction is performed on data from the segment memories. In the preferred embodiments, plural processing clusters 114 perform color correction of data for plural segment memories 105 in parallel, thereby increasing processing efficiency.

In step S406, color-corrected image data is output from segment memories 105. The color-corrected image data could be output, for example, through data bus 107 or through some other connection to a memory for storing data for an entire image generated by segmented SSA 101.

FIRST EMBODIMENT OF A COLOR CORRECTION METHOD

FIGS. 5 through 10 are diagrams for explaining a first embodiment of a color correction method according to the invention.

Briefly, according to this embodiment, overlap data from at least a first half of the segment memories is loaded into a memory buffer. Overlap data from the memory buffer is combined with data from a second half of the segment memories. Color correction is performed of boundary data, based on the combined data, and of non-boundary data for each of the segment memories. Preferably, color-corrected boundary data is loaded back into the memory buffer, and color-corrected non-boundary data from the first half of the segment memories is combined with color-corrected boundary data from the memory buffer. Preferably, the non-corrected data is trimmed away. The color-corrected boundary data and non-boundary data is then output from each of the segment memories.

Figure 5:
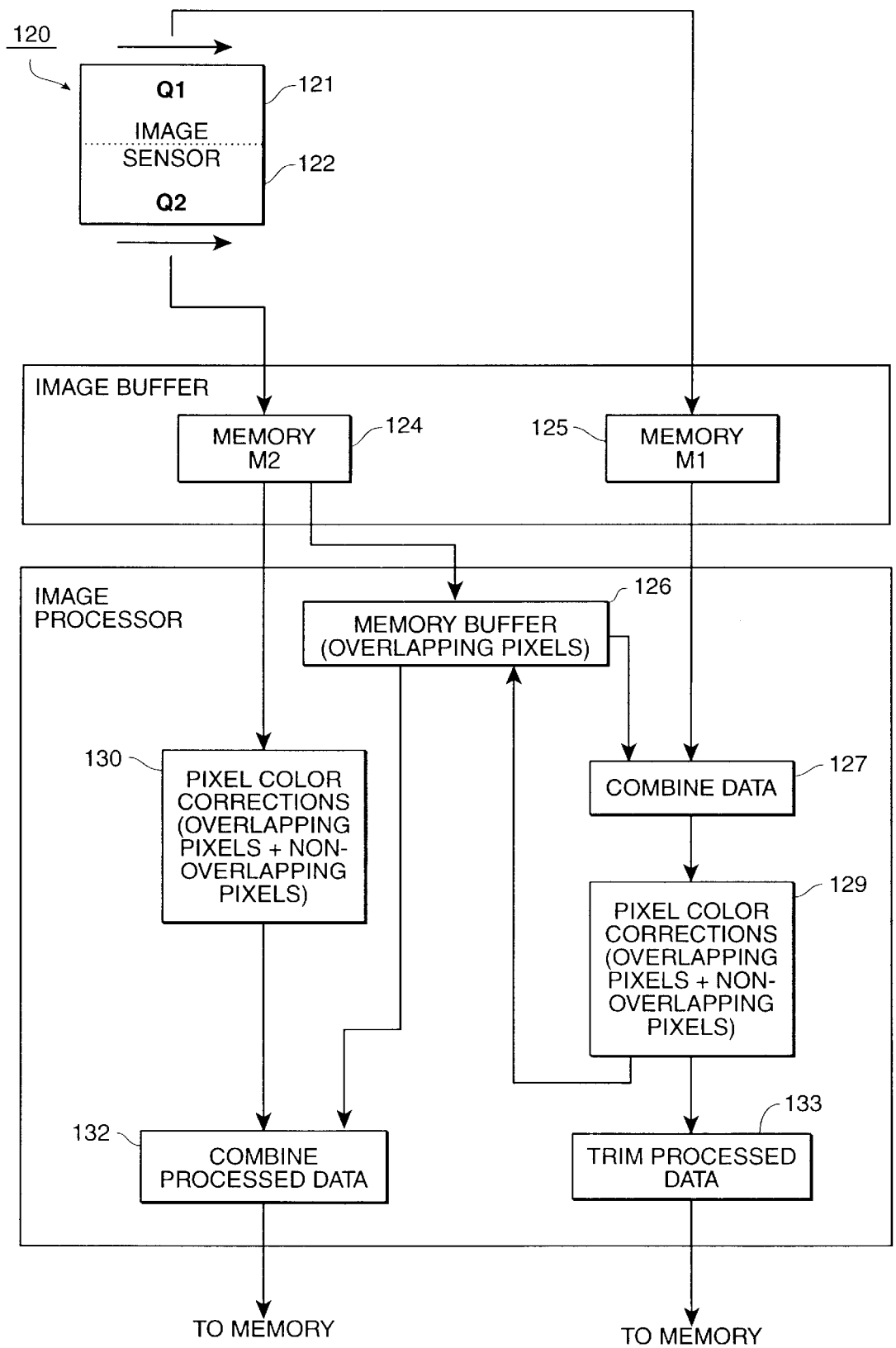
FIG. 5 is a data flow diagram for explaining a first embodiment of a color correction method according to the invention, applied to a two segment imaging sensor.

In more detail, as shown in FIG. 5, segmented imaging sensor 120 has two sensor segments 121 and 122. Data is shifted from sensor segments 121 and 122 to segment memories M1 and M2 in blocks 125 and 124, respectively.

Data from segment memories M1 and M2 are processed by a media processor according to the invention in blocks 126 through 133. In particular, overlap data from half of the segment memories, which in FIG. 5 is memory M2, is loaded into a memory buffer of the media processor in block 126. This overlap data is then combined with data from the other half of the segment memories, which in FIG. 5 is memory M1, in block 127.

In blocks 129 and 130, color correction is performed on the data. Block 129 performs color correction on the combined data from block 127. Block 130 performs color correction on data from segment memory M2. Preferably, blocks 129 and 130 are performed in parallel by two separate processing clusters in the media processor.

Corrected boundary data from block 129 that corresponds to boundary data for sensor segment 122 is loaded back into the memory buffer. In block 132, this corrected data is combined with corrected data from block 130. The output of block 132 is color-corrected data for sensor segment 122.

Likewise, the output of block 129 is trimmed so as to remove data which does not correspond to sensor segment 121. This trimming operation occurs in block 133, the output of which is color-corrected data for sensor segment 121.

FIGS. 6 through 9 are illustrations of segment and buffer memory contents for different implementations of the embodiment described above with respect to FIG. 5. In these figures, bold-faced data positions indicate data which has been color-corrected.

Figure 6:
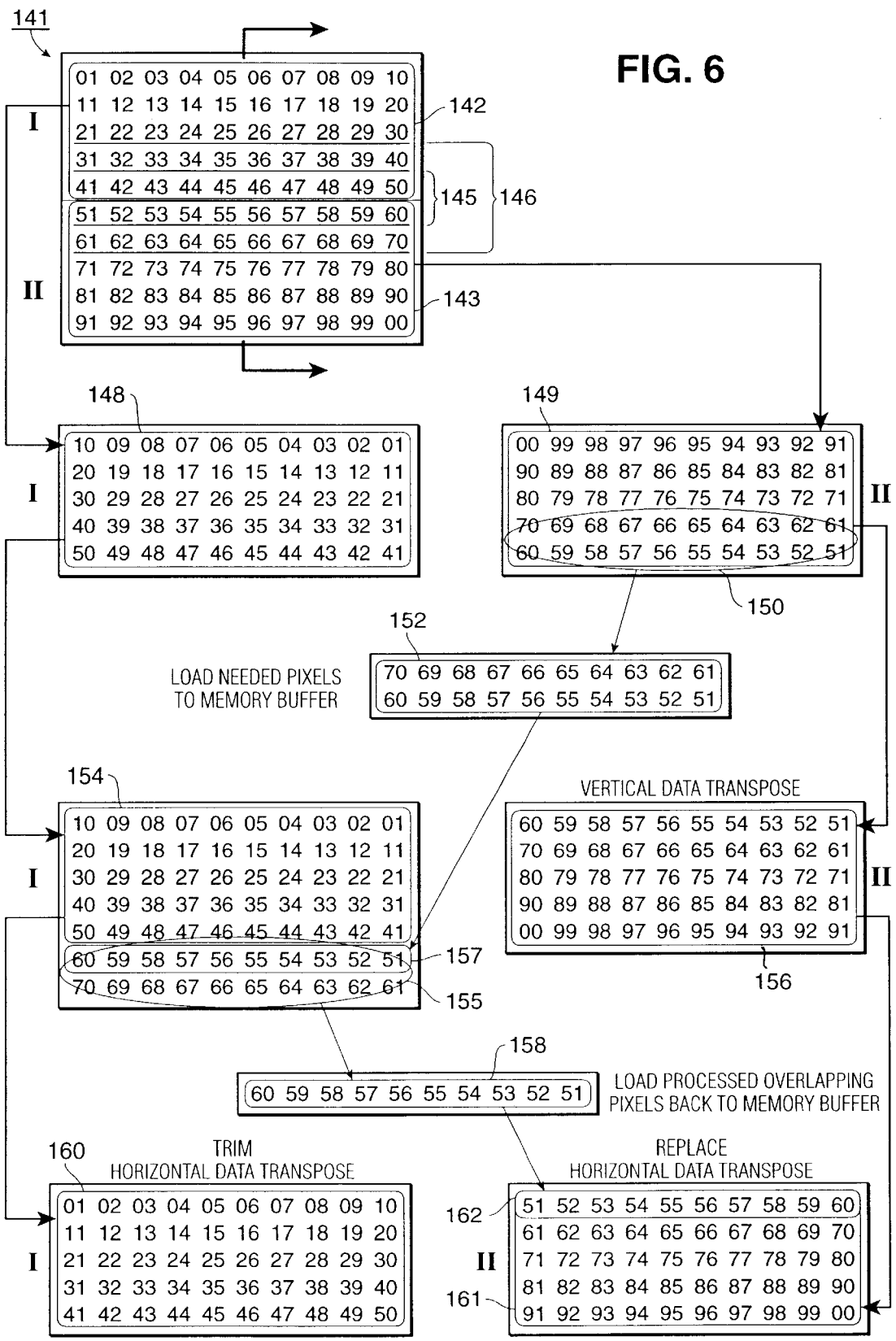
FIGS. 6 to 9 are illustrations of segment and buffer memory contents for different implementations of the embodiment shown in FIG 5.

FIG. 6 illustrates buffer and segment memory contents in a case that two sensor segments of an imaging sensor are separated by a horizontal boundary, in which data is shifted out of the sensor segments from right to left. Thus, sensor segment data is shifted out from right to left. In contrast, data from memory buffer 112 and segment memories 105 is shifted out from left to right starting from the uppermost row.

In FIG. 6, array 141 represents data from two such sensor segments. Data 142 is from a top sensor segment, and data 143 is from a bottom sensor segment. Data 145 represents boundary data from each of the sensor segments for which color correction is performed based at least in part on data from both sensor segments. Data 146 represents overlap data used to color-correct various parts of boundary data 145, by using a 3×3 matrix, for example.

For example, in one implementation, boundary data from the bottom sensor segment at position 56 in data 143 is color-corrected according to the invention based on boundary overlap data at positions 45, 46 and 47 in data 142 and based on overlap data at positions 55 and 57 (boundary data) and position 65, 66 and 67 (non-boundary data) in data 143.

As shown in FIG. 6, data 142 is shifted to segment memory I as data 148, and data 143 is shifted to segment memory II as data 149. Then, overlap data 150, which corresponds to overlap data 146 in data 143, is loaded to a memory buffer of a media processor according to the invention as data 152.

Data 148 from segment memory I and data 152 from the memory buffer are combined into segment memory I as data 154 and 155. Preferably at the same time, data 149 from segment memory II is vertically transposed into data 156 in segment memory II. In this manner, the bottom rows of data 156 become the top rows, and vice versa.

Color correction is then performed on the contents of segment memories I and II, preferably in parallel. As shown in FIG. 6, color correction preferably is not performed on a bottom-most row of data in segment memory I and a top-most row of data in segment memory II, because each memory does not contain all data required for color correction of that data. Rather, the uncorrected data is used in color correction of other data in the respective segment memories.

After the color correction has been performed, the segment memories include corrected data for all boundary and non-boundary data. Then, data 157, which is a top part of overlap data 155, is loaded back into the memory buffer as corrected boundary data 158. Boundary data 158 is half of all of the corrected boundary data.

The corrected boundary data replaces non-corrected boundary data in segment memory II, becoming data 162. The data in segment memory II is horizontally transposed in order to arrive at data 161 in FIG. 6, which corresponds to all of data 143. In this manner, the right-most data becomes the left-most data and vice versa.

Because segment memory I already contains corrected data corresponding to all of data 142, the data in segment memory I need only be trimmed and horizontally transposed in order to arrive at color-corrected data 160.

Figure 7:
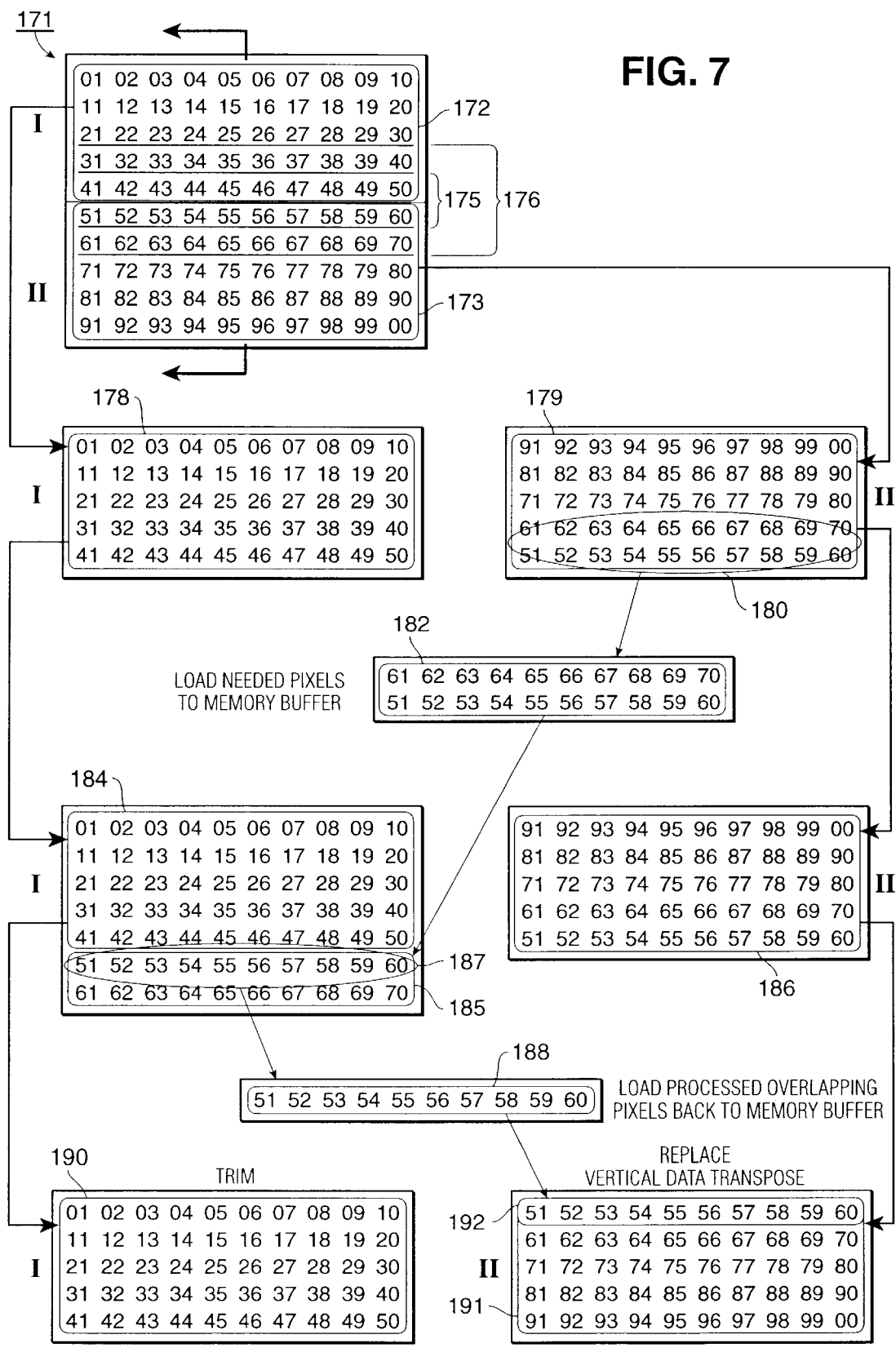

FIG. 7 illustrates buffer and segment memory contents in a case that two sensor segments of an imaging sensor are separated by a horizontal boundary, in which data is shifted out of the sensor segments from left to right.

In FIG. 7, array 171 represents data from two such sensor segments. Data 172 is from a top sensor segment, and data 173 is from a bottom sensor segment. Data 175 represents boundary data from each of the sensor segments for which color correction is performed based at least in part on data from both sensor segments. Data 176 represents overlap data used to color-correct various parts of boundary data 175.

As shown in FIG. 7, data 172 is shifted to segment memory I as data 178, and data 173 is shifted to segment memory II as data 179. Then, overlap data 180, which corresponds to overlap data 176 in data 173, is loaded to a memory buffer of a media processor according to the invention as data 182.

Data 178 from segment memory I and data 182 from the memory buffer are combined into segment memory I as data 184 and 185. Color correction is performed on this combined data. Preferably in parallel, data 179 from segment memory II is color-corrected into data 186.

As shown in FIG. 7, color correction preferably is not performed on a bottom-most row of data in segment memory I and a bottom-most row of data in segment memory II, because each memory does not contain all data required for color correction of that data. Rather, the uncorrected data is used in color correction of other data in the respective segment memories.

After the color correction has been performed, the segment memories include corrected data for all boundary and non-boundary data. Then, data 187, which is a top part of overlap data 185, is loaded back into the memory buffer as corrected boundary data 188. Boundary data 188 is half of all of the corrected boundary data.

The corrected boundary data replaces non-corrected boundary data in segment memory II, becoming data 192. The data in segment memory II is vertically transposed in order to arrive at data 191 in FIG. 7, which corresponds to all of data 173.

Because segment memory I already contains corrected data corresponding to all of data 172, and because the corrected data is in the same order as data 172, the data in segment memory I need only be trimmed in order to arrive at color-corrected data 190.

Figure 8:
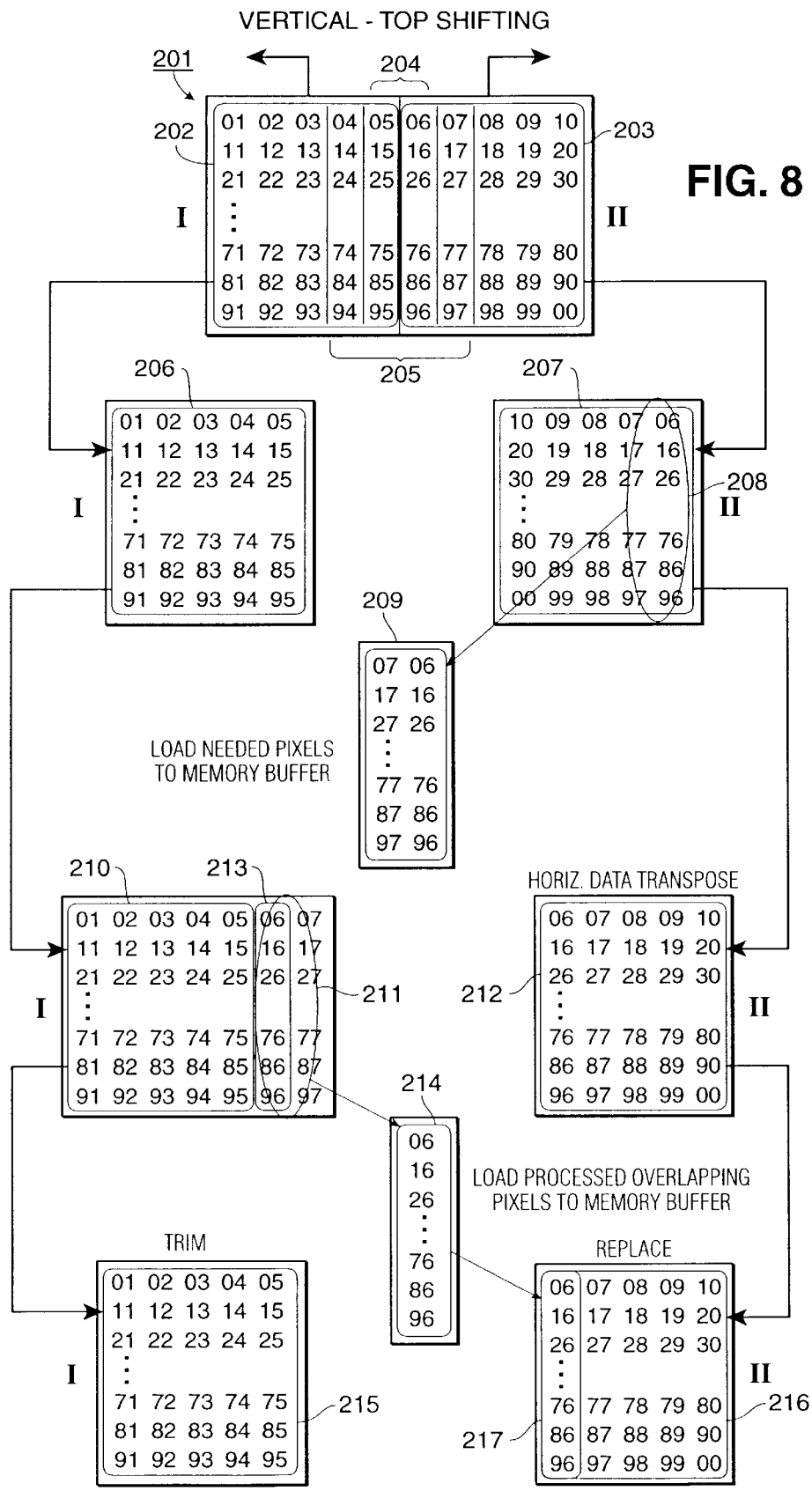

FIG. 8 illustrates buffer and segment memory contents in a case that two sensor segments of an imaging sensor are separated by a vertical boundary, in which data is shifted out of the sensor segments from the top to the bottom, and from left to right, of the sensor.

In FIG. 8, array 201 represents data from two such sensor segments. Data 202 is from a left sensor segment, and data 203 is from a right sensor segment. Data 204 represents boundary data from each of the sensor segments for which color correction is performed based at least in part on data from both sensor segments. Data 205 represents overlap data used to color-correct various parts of boundary data 204.

As shown in FIG. 8, data 202 is shifted to segment memory I as data 206, and data 203 is shifted to segment memory II as data 207. Then, overlap data 208, which corresponds to overlap data 205 in data 203, is loaded to a memory buffer of a media processor according to the invention as data 209.

Data 206 from segment memory I and data 209 from the memory buffer are combined into segment memory I as data 210 and 211. Preferably at the same time, data 207 from segment memory II is horizontally transposed into data 212 in segment memory II.

Color correction is then performed on the contents of segment memories I and II, preferably in parallel. As shown in FIG. 8, color correction preferably is not performed on a right-most column of data in segment memory I and a left-most column of data in segment memory II, because each memory does not contain all data required for color correction of that data. Rather, the uncorrected data is used in color correction of other data in the respective segment memories.

After the color correction has been performed, the segment memories include corrected data for all boundary and non-boundary data. Then, data 213, which is a left part of overlap data 211, is loaded back into the memory buffer as corrected boundary data 214. Boundary data 214 is half of all of the corrected boundary data.

The corrected boundary data replaces non-corrected boundary data in segment memory II, becoming data 217. After the non-corrected data is replaced, segment memory II contains color-corrected data 216, which corresponds to all of data 203.

Because segment memory I already contains corrected data corresponding to all of data 202, and because the corrected data is in the same order as data 202, the data in segment memory I need only be trimmed in order to arrive at color-corrected data 215.

Figure 9:
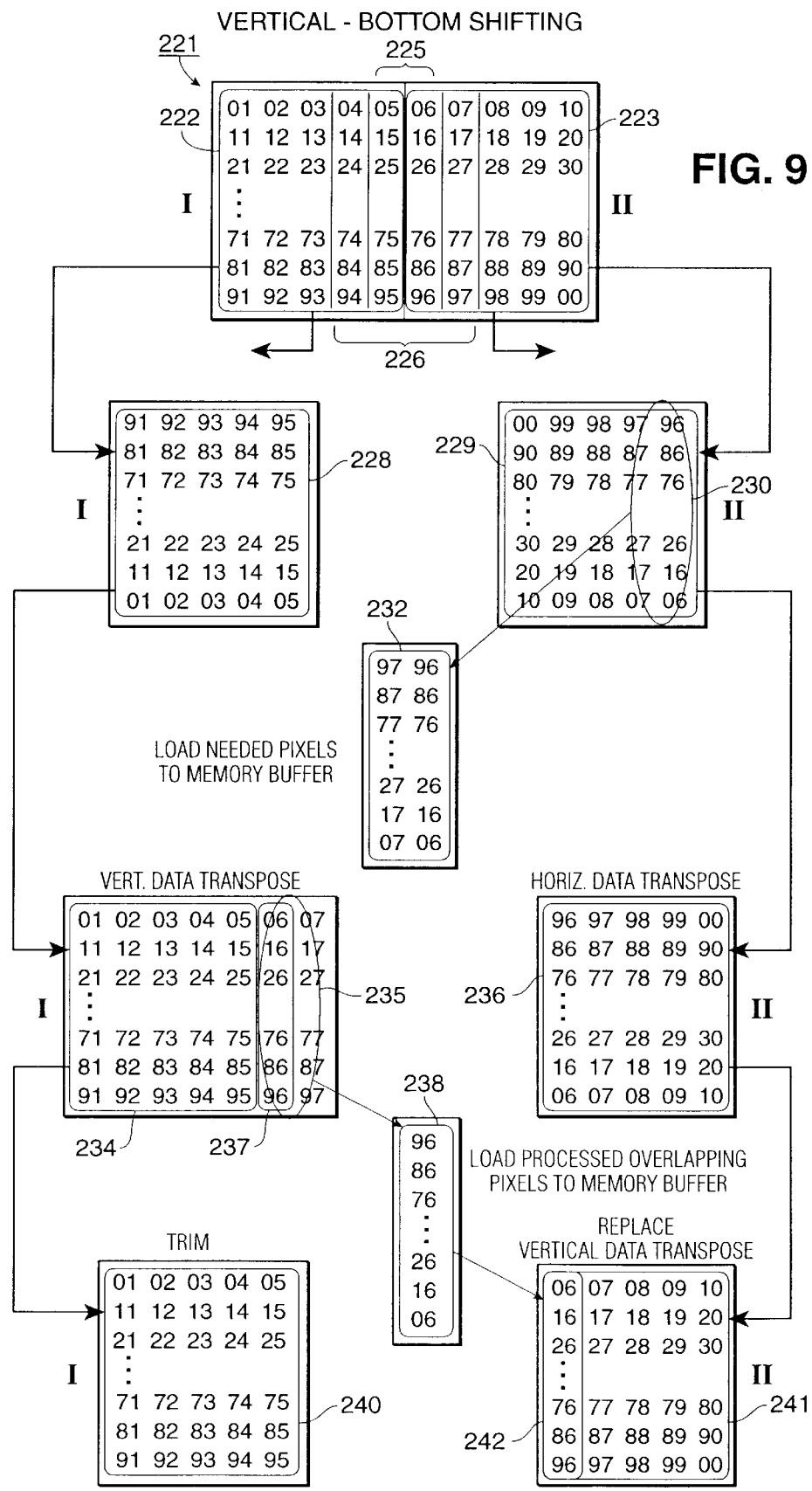

FIG. 9 illustrates buffer and segment memory contents in a case that two sensor segments of an imaging sensor are separated by a vertical boundary, in which data is shifted out of the sensor segments from the bottom of the sensor. The order in which data is shifted out of the sensor segments can vary according to the design of the image sensor device.

In FIG. 9, array 221 represents data from two such sensor segments. Data 222 is from a left sensor segment, and data 223 is from a right sensor segment. Data 225 represents boundary data from each of the sensor segments for which color correction is performed based at least in part on data from both sensor segments. Data 226 represents overlap data used to color-correct various parts of boundary data 225.

As shown in FIG. 9, data 222 is shifted to segment memory I as data 228, and data 223 is shifted to segment memory II as data 229. Then, overlap data 230, which corresponds to overlap data 226 in data 223, is loaded to a memory buffer of a media processor according to the invention as data 232.

Data 228 from segment memory I and data 232 from the memory buffer are combined and vertically transposed into segment memory I as data 234 and 235. Preferably at the same time, data 229 from segment memory II is horizontally transposed into data 236 in segment memory II.

Color correction is then performed on the contents of segment memories I and II, preferably in parallel. As shown in FIG. 9, color correction preferably is not performed on a right-most column of data in segment memory I and a left-most column of data in segment memory II, because each memory does not contain all data required for color correction of that data. Rather, the uncorrected data is used in color correction of other data in the respective segment memories.

After the color correction has been performed, the segment memories include corrected data for all boundary and non-boundary data. Then, data 237, which is a left part of overlap data 235, is loaded back into the memory buffer as corrected boundary data 238. Boundary data 238 is half of all of the corrected boundary data.

The corrected boundary data replaces non-corrected boundary data in segment memory II, becoming data 242. The data in segment memory II is then vertically transposed in order to arrive at data 241 in FIG. 9, which corresponds to all of data 223.

Because segment memory I already contains corrected data corresponding to all of data 222, and because the corrected data is in the same order as data 222, the data in segment memory I need only be trimmed in order to arrive at color-corrected data 240.

It should be noted that in the foregoing implementation examples, various data transposition operations were performed so as to order the data appropriately. In alternative embodiments, different data transpositions can be utilized.

Figure 10:
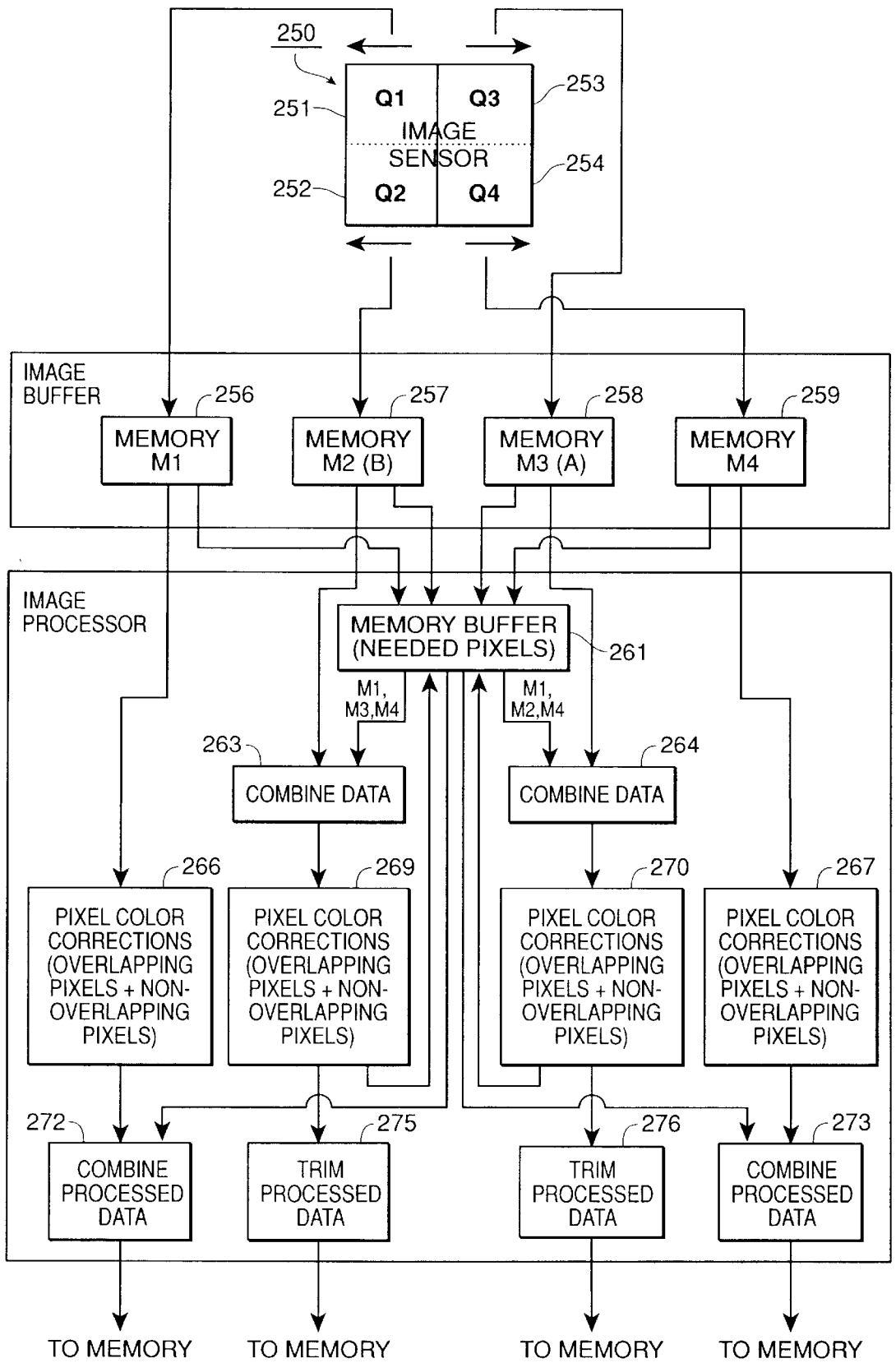
FIG. 10 is a data flow diagram for explaining the first embodiment of a color correction method according to the invention, applied to a four segment imaging sensor.

FIG. 10 is a data flow diagram for explaining the first embodiment of a color correction method according to the invention, applied to a four segment imaging sensor.

As shown in FIG. 10, segmented imaging sensor 250 has four sensor segments 251, 252, 253 and 254. Data is shifted from sensor segments 251, 252, 253 and 254 to segment memories M1, M2, M3 and M4 in blocks 256, 257, 258 and 259, respectively.

Data from segment memories M1, M2, M3 and M4 are processed by a media processor according to the invention in blocks 261 through 276. In particular, boundary and/or non-boundary overlap data from the segment memories is loaded into a memory buffer of the media processor in block 261. This data is then combined with data from half of the segment memories, which in FIG. 10 are memories M2 and M3, in block 263 and 264. The combined data is stored in memories M2 and M3.

In blocks 266, 267, 269 and 270, color correction is performed on the data. Blocks 266 and 267 perform color correction on data from segment memories M1 and M4. Blocks 269 and 270 perform color correction on the combined data from blocks 263 and 264. Preferably, at least some of blocks 266, 267, 269 and 270 are performed in parallel by separate processing clusters in the media processor. Even more preferably, all four blocks are performed in parallel by multiple processing clusters. Preferably, four processing clusters are used for performing the color correction.

Corrected boundary data from block 269 for sensor segments 251, 254 and 253 is loaded back into the memory buffer. In a similar manner, corrected boundary data from block 270 for sensor segments 253, 252 and 251 is loaded back into the memory buffer.

Likewise, the outputs of blocks 269 and 270 are trimmed so as to remove data which does not correspond to sensor segments 252 and 253. These trimming operations occur in blocks 275 and 276, the outputs of which are color-corrected data for sensor segments 252 and 253.

SECOND EMBODIMENT OF A COLOR CORRECTION METHOD

Figure 11:
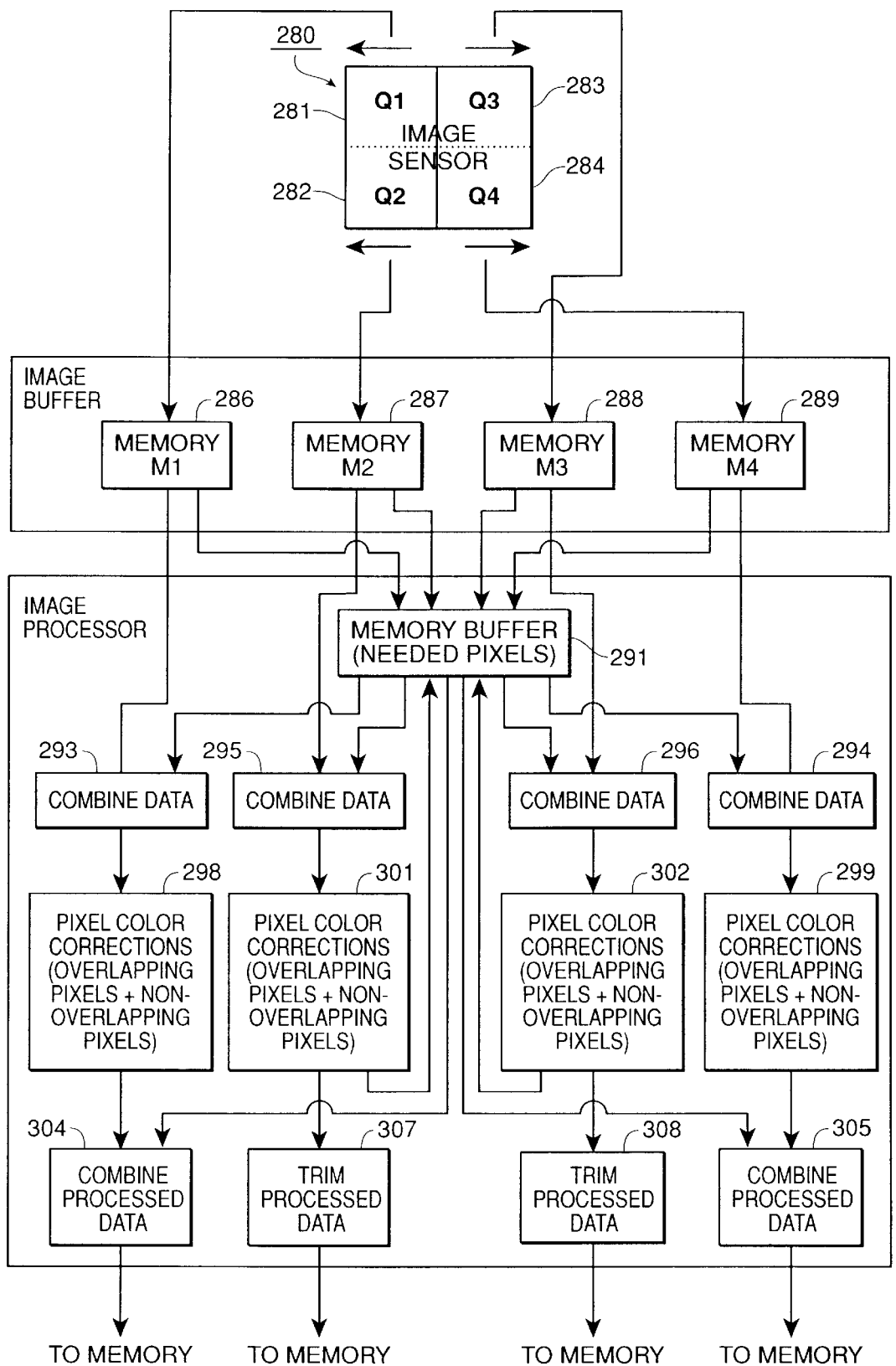
FIG. 11 is a data flow diagram for explaining a second embodiment of a color correction method according to the invention, applied to a four segment imaging sensor.

FIG. 11 is a data flow diagram for explaining a second embodiment of a color correction method according to the invention, applied to a four segment imaging sensor.

Briefly, according to this embodiment, boundary data from all of the segment memories and non-boundary overlap data from a first half of the segment memories are loaded into a memory buffer. Boundary data from the memory buffer is combined with data from each of the segment memories, and non-boundary overlap data from the memory buffer is combined with data from a second half of the segment memories. Color correction is performed of boundary data, based on the combined data, and of non-boundary data for each of the segment memories. Preferably, color-corrected boundary data is loaded back into the memory buffer, and color-corrected non-boundary data from the segment memories is combined with color-corrected boundary data from the memory buffer. The color-corrected boundary data and non-boundary data preferably are output from each of the segment memories.

In more detail, as shown in FIG. 11, segmented imaging sensor 280 has four sensor segments 281, 282, 283 and 284. Data is shifted from sensor segments 281, 282, 283 and 284 to segment memories M1, M2, M3 and M4, respectively, in blocks 286, 287, 288 and 289. It should be noted that the current art of image sensor devices allows data to shift from left to right for sensor segments 281 and 282, and from right to left for sensor segments 283 and 284.

Data from segment memories M1, M2, M3 and M4 are processed by a media processor according to the invention in blocks 291 through 308. In particular, boundary data from all of the segment memories (M1, M2, M3 and M4) and non-boundary overlap data from a first half of the segment memories (M1 and M4) are loaded into a memory buffer of the media processor in block 291. This data is then combined with data from all of the segment memories in blocks 293, 294, 295 and 296. The combined data is stored in the segment memories.

In blocks 298, 299, 301 and 302, color correction is performed on the combined data. Preferably, at least some of blocks 298, 299, 301 and 302 are performed in parallel by separate processing clusters in the media processor. Even more preferably, all four blocks are performed in parallel by four processing clusters.

Corrected boundary data from blocks 301 and 302 that corresponds to boundary data for sensor segments 281 and 284 is loaded back into the memory buffer. In blocks 304 and 305, this corrected data is combined with corrected data from blocks 298 and 299. The outputs of blocks 304 and 305 are color-corrected data for sensor segments 281 and 284, respectively.

Likewise, the outputs of blocks 301 and 302 are trimmed so as to remove data which does not correspond to sensor segments 282 and 283. These trimming operations occur in blocks 307 and 308, the outputs of which are color-corrected data for sensor segments 282 and 283.

Figure 12:
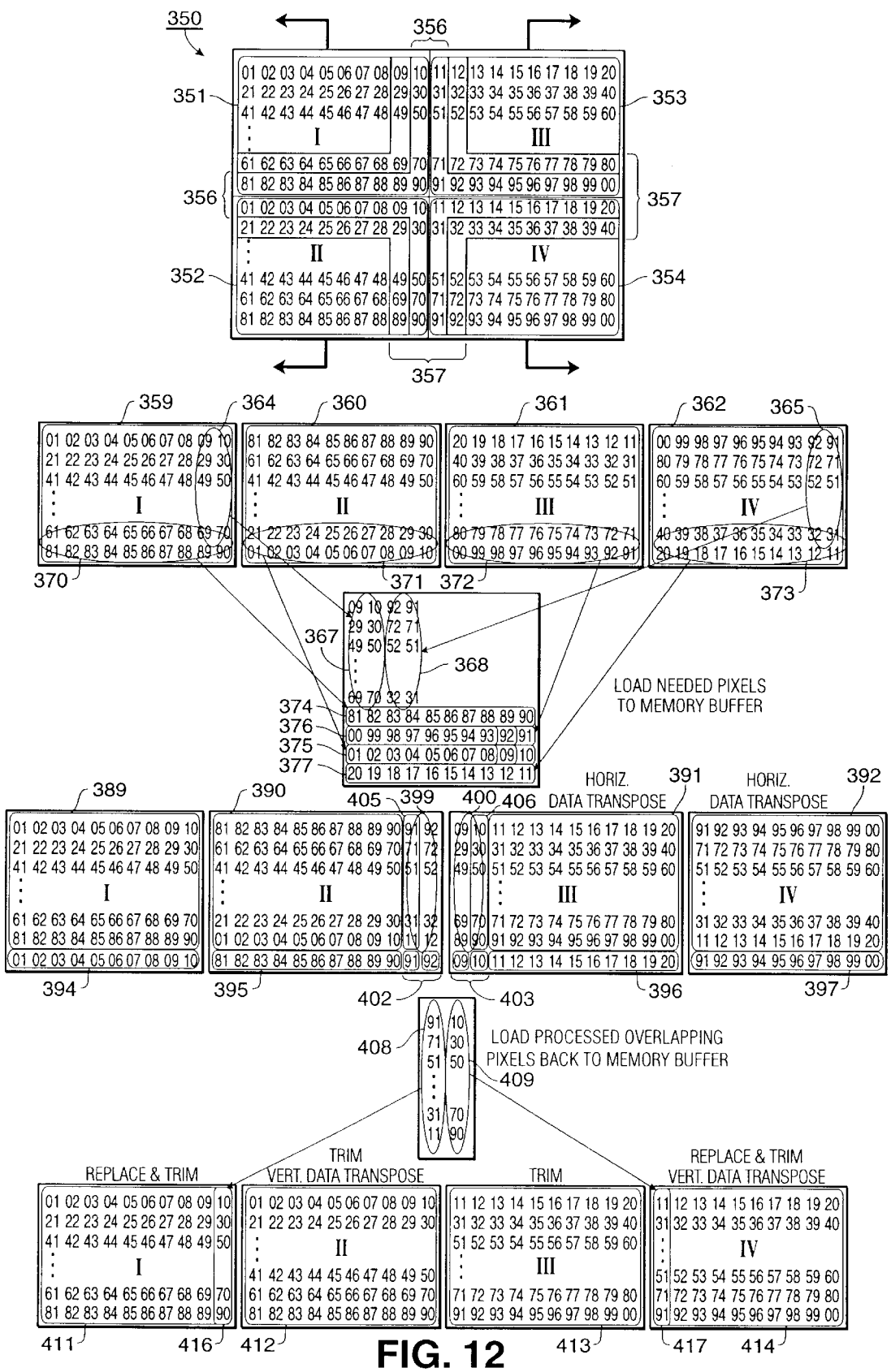
FIG. 12 is an illustration of segment and buffer memory contents for an implementation of the embodiment shown in FIG. 11.

FIG. 12 is an illustration of segment and buffer memory contents for an implementation of the embodiment shown in FIG. 11. In FIG. 12, bold-faced data positions indicate data which has been color-corrected.

In FIG. 12, array 350 represents data from four sensor segments of an image sensor. Data 351 is from a top left sensor segment, data 352 is from a bottom left sensor segment, data 353 is from a top right sensor segment, and data 354 is from a bottom right sensor segment. Data 356 represents boundary data from each of the sensor segments for which color correction is performed based at least in part on data from both sensor segments. Data 357 represents overlap data used to color-correct various parts of boundary data 356.

As shown in FIG. 12, data 351 is shifted to segment memory I as data 359, data 352 is shifted to segment memory II as data 360, data 353 is shifted to segment memory III as data 361, and data 354 is shifted to segment memory IV as data 362. Then, boundary data from all of the segment memories and non-boundary overlap data from a first half (i.e., two) of the segment memories are loaded into a memory buffer of a media processor according to the invention.

In more detail, boundary data 370 from segment memory I, boundary data 371 from segment memory II, boundary data 372 from segment memory III, and boundary data 373 from segment memory IV are loaded into the memory buffer as data 374, 375, 376 and 377. In addition, data 364 from segment memory I, which corresponds to overlap data 357 of data 351, and data 365 from segment memory IV, which corresponds to overlap data 357 of data 354, are loaded into the memory buffer as data 367 and 368. As shown in FIG. 12, this overlap data includes non-boundary data.

Data 359 from segment memory I and data 375 from the memory buffer are combined into segment memory I as data 389 and 394. Data 360 from segment memory II is combined with data 368, data 374 and part of data 376 from the memory buffer. This combined data is stored in segment memory II as data 390, 395, 399 and 402. Direct memory access to the data buffer preferably is used when combining the data.

Likewise, data 361 from segment memory III is combined with data 367, data 377 and part of data 375 from the memory buffer. This combined data is horizontally transposed and then stored in segment memory III as data 391, 396, 400 and 403. Direct memory access to the data buffer preferably is used when combining the data. Data 362 from segment memory IV and data 376 from the memory buffer are combined into segment memory IV as data 392 and 397. Preferably at the same time, the contents of segment memories III and IV are horizontally transposed.

Color correction is then performed on the contents of segment memories I, II, III and IV, preferably in parallel. As shown in FIG. 12, color correction preferably is not performed on the right-most columns and bottom-most rows of data in segment memories I and II, and on the left-most columns and bottom-most rows of data in segment memories III and IV. Instead, the uncorrected data is the overlap data used to color-correct adjacent boundary data.

After the color correction has been performed, the segment memories include corrected data for all boundary and non-boundary data. Then, data 405, which is a left-most part of overlap data 399, is loaded back into the memory buffer as corrected boundary data 408. Likewise, data 406, which is a right-most part of overlap data 400, is loaded into the memory buffer as data 409. This corrected overlap data then replaces corresponding non-corrected data in segment memories I and IV, becoming corrected data 416 and 417.

After the replacement operation, each of the segment memories contains corrected data corresponding to data 351, 352, 353 and 354 from each of the sensor segments. All other data in the segment memories is discarded so as to arrive at color-corrected data 411, 412, 413 and 414.

It should be noted that various details of the foregoing implementation example, such as the timing of the various data transpositions, can be varied without departing from the scope of the second embodiment.

THIRD EMBODIMENT OF A COLOR CORRECTION METHOD

Figure 13:
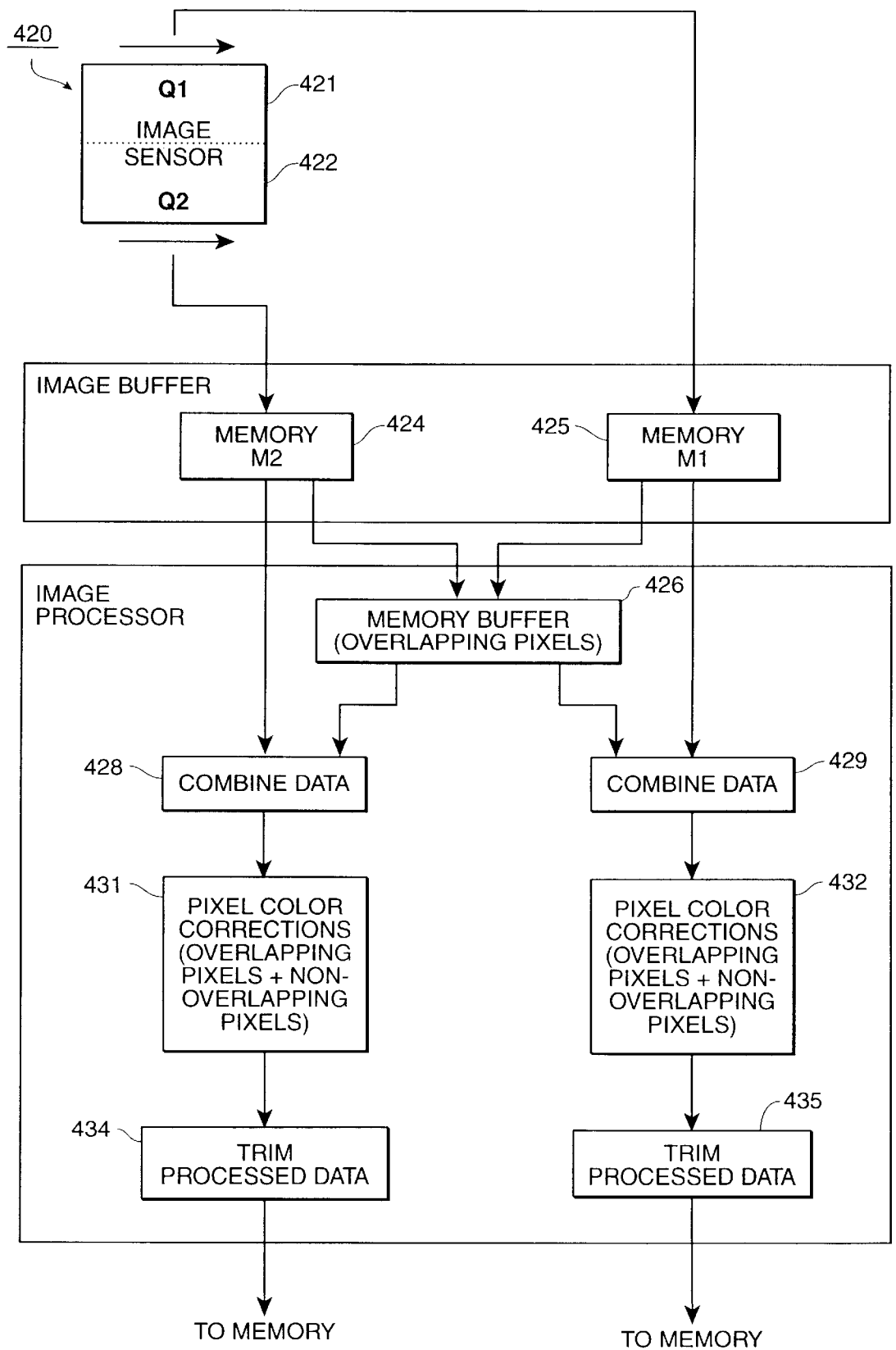
FIG. 13 is a data flow diagram for explaining a third embodiment of a color correction method according to the invention, applied to a two segment sensor.

FIG. 13 is a data flow diagram for explaining a third embodiment of a color correction method according to the invention, applied to a two segment sensor.

Briefly, according to this embodiment, boundary data from all of the segment memories is loaded into the memory buffer. Data from the memory buffer is combined with data from each of the segment memories. Color correction is performed of boundary data, based on the combined data, and of non-boundary data for each of the segment memories. Preferably, non-corrected data is trimmed away, and color-corrected boundary data and non-boundary data are output from each of the segment memories.

In more detail, as shown in FIG. 13, segmented imaging sensor 420 has two sensor segments 421 and 422. Data is shifted from sensor segments 421 and 422 to segment memories M1 and M2 in blocks 424 and 425.

Data from segment memories M1 and M2 are processed by a media processor according to the invention in blocks 426 through 435. In particular, boundary data from each of the segment memories is loaded into a memory buffer of the media processor in block 426. Then, in block 428, overlap data from segment memory M1 is combined with non-overlap data from segment memory M2, and the combined data is stored in segment memory M2. Likewise, in block 429, overlap data from segment memory M2 is combined with non-overlap data from segment memory M1, and the combined data is stored in segment memory M1.

In blocks 431 and 432, color correction is performed on the data in the segment memories. Block 431 performs color correction on the combined data from block 428 so as to color-correct all data corresponding to sensor segment 422. Block 432 performs color correction on the combined data from block 429 so as to color-correct all data corresponding to sensor segment 421. Preferably, blocks 431 and 432 are performed in parallel by two separate processing clusters in the media processor.

In block 434, all data which does not correspond to sensor segment 422 is trimmed from sensor memory M2. Likewise, in block 435, all data which does not correspond to sensor segment 421 is trimmed from sensor memory M1. After blocks 434 and 435, each segment memory preferably contains color-corrected data corresponding to its respective sensor segment.

FIGS. 14 through 17 are illustrations of segment and buffer memory contents for different implementations of the embodiment described above with respect to FIG. 13. In these figures, bold-faced data positions indicate data which has been color-corrected.

Figure 14:
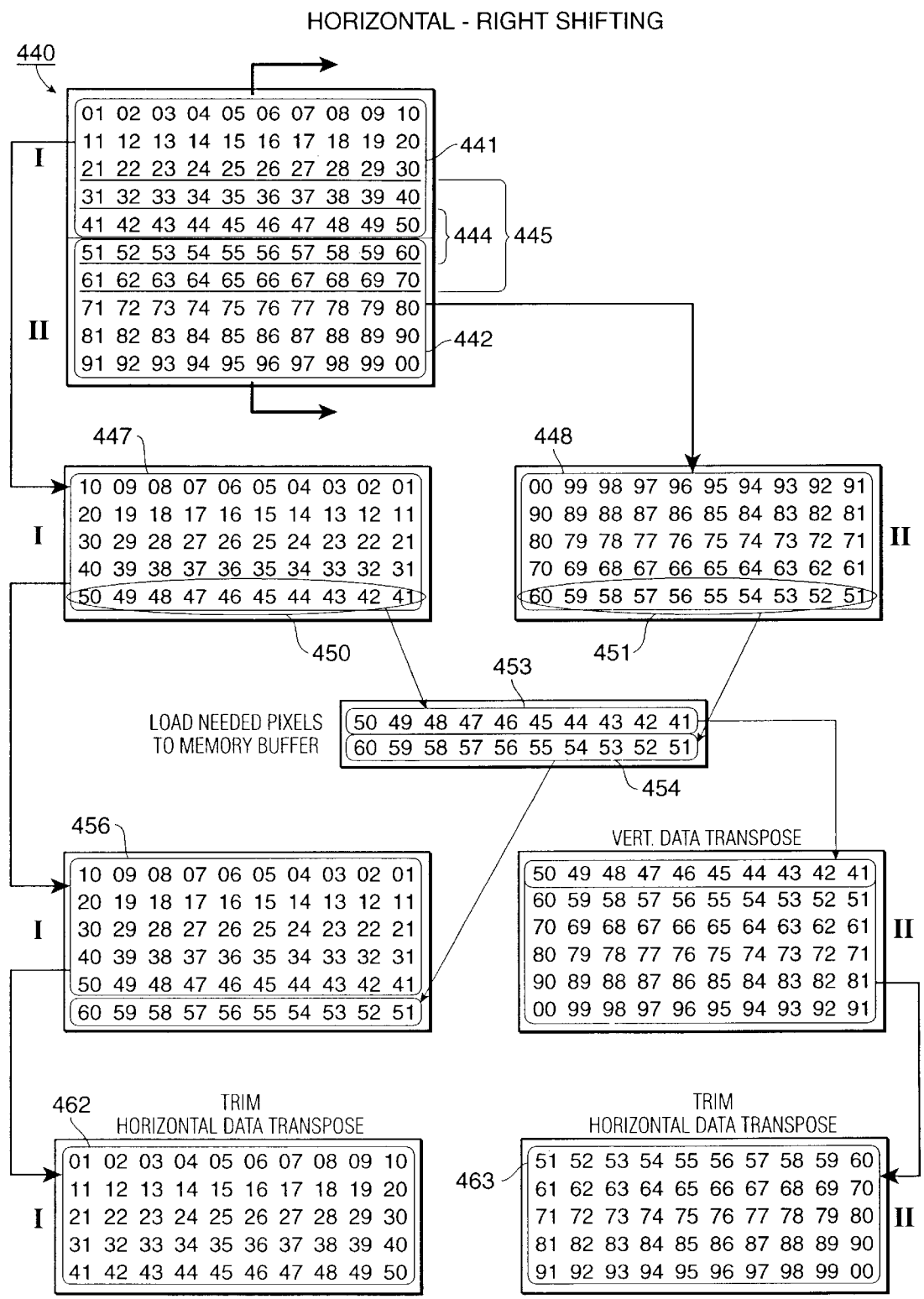
FIGS. 14 to 17 are illustrations of segment and buffer memory contents for different implementations of the embodiment shown in FIG. 13.

FIG. 14 illustrates buffer and segment memory contents in a case that two sensor segments of an imaging sensor are separated by a horizontal boundary, in which data is shifted out of the sensor segments from right to left.

In FIG. 14, array 440 represents data from two such sensor segments. Data 441 is from a top sensor segment, and data 442 is from a bottom sensor segment. Data 444 represents boundary data from each of the sensor segments for which color correction is performed based at least in part on data from both sensor segments. Data 445 represents overlap data used to color-correct various parts of boundary data 444.

As shown in FIG. 14, data 441 is shifted to segment memory I as data 447, and data 442 is shifted to segment memory II as data 448. Then, overlap data from each of the segment memories is loaded into a memory buffer according to the invention. Thus, overlap data 450, which corresponds to overlap data 444 in data 441, is loaded into the memory buffer as data 453, and overlap data 451, which corresponds to overlap data 444 in data 442, is loaded into the memory buffer as data 454.

Data from each of the segment memories corresponding to each of the sensor segments is then combined with overlap data from the memory buffer corresponding to adjacent sensor segments. In more detail, data 447 from segment memory I corresponding to sensor segment 441 is combined with overlap data 454 from the memory buffer, and the combined data is stored in segment memory I as data 456 and 459. Likewise, data 448 from segment memory II corresponding to sensor segment 442 is combined with overlap data 453 from the memory buffer, and the combined data is stored in segment memory II as data 457 and 460. The data in segment memory II also is vertically transposed.

Color correction is performed on the contents of segment memories I and II, preferably in parallel. As shown in FIG. 14, color correction preferably is not performed on a bottom-most row of data in segment memory I and a top-most row of data in segment memory II, because each memory does not contain all data required for color correction of that data. Rather, the uncorrected data is used in color correction of other data in the adjacent segment memories.

After the color correction has been performed, the segment memories include corrected data for all boundary and non-boundary data. All uncorrected data preferably is trimmed from the segment memories, and the data in segment memory I is horizontally transposed, resulting in corrected data 462 and 463.

Figure 15:
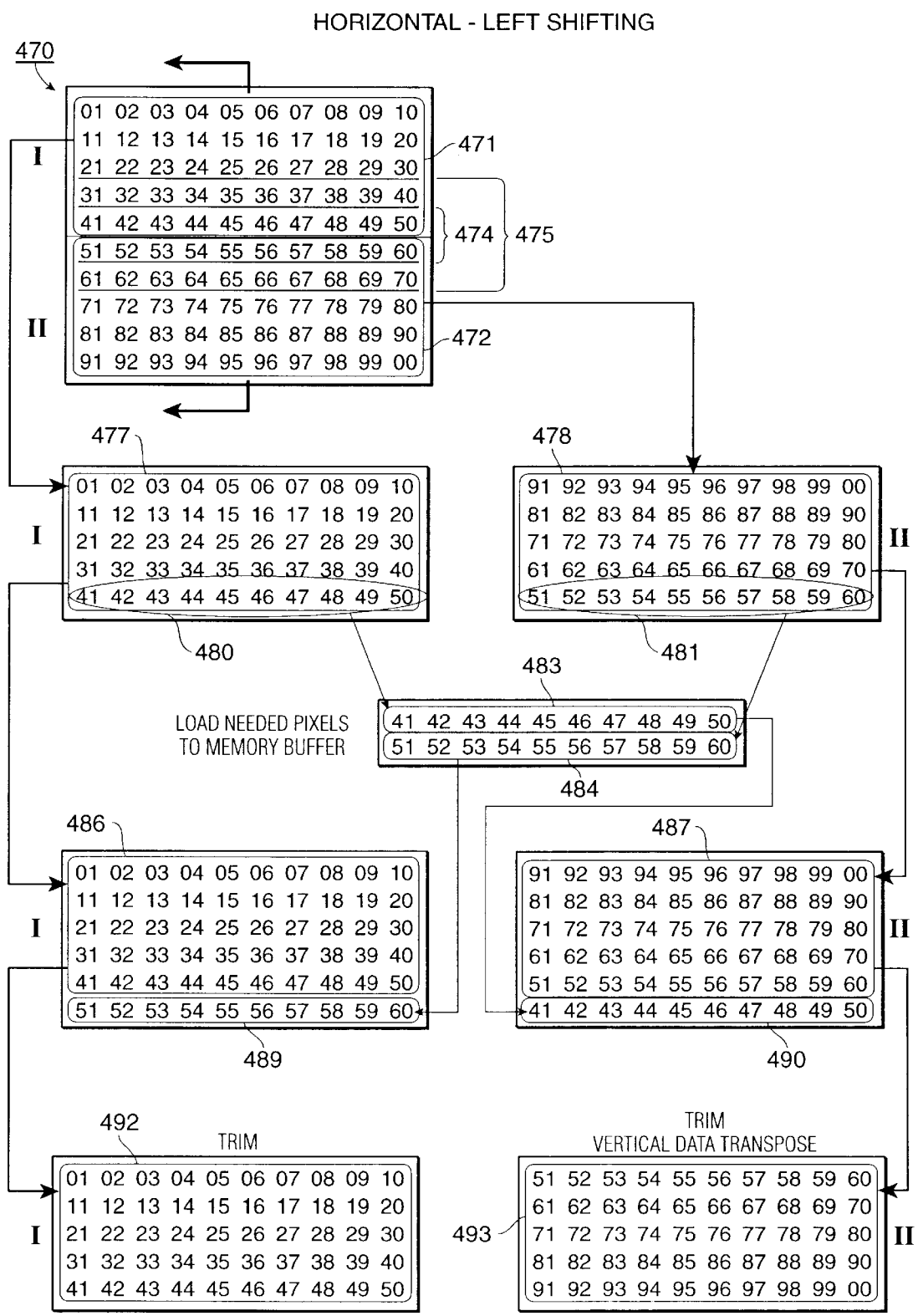

FIG. 15 illustrates buffer and segment memory contents in a case that two sensor segments of an imaging sensor are separated by a horizontal boundary, in which data is shifted out of the sensor segments from left to right.

In FIG. 15, array 470 represents data from two such sensor segments. Data 471 is from a top sensor segment, and data 472 is from a bottom sensor segment. Data 474 represents boundary data from each of the sensor segments for which color correction is performed based at least in part on data from both sensor segments. Data 475 represents overlap data used to color-correct various parts of boundary data 474.

As shown in FIG. 15, data 471 is shifted to segment memory I as data 477, and data 472 is shifted to segment memory II as data 478. Then, overlap data from each of the segment memories is loaded into a memory buffer according to the invention. Thus, overlap data 480, which corresponds to overlap data 474 in data 471, is loaded into the memory buffer as data 483, and overlap data 481, which corresponds to overlap data 474 in data 472, is loaded into the memory buffer as data 484.

Data from each of the segment memories corresponding to each of the sensor segments is then combined with overlap data from the memory buffer corresponding to adjacent sensor segments. In more detail, data 477 from segment memory I corresponding to sensor segment 471 is combined with overlap data 484 from the memory buffer, and the combined data is stored in segment memory I as data 486 and 489. Likewise, data 478 from segment memory II corresponding to sensor segment 472 is combined with overlap data 483 from the memory buffer, and the combined data is stored in segment memory II as data 487 and 490.

Color correction is performed on the contents of segment memories I and II, preferably in parallel. As shown in FIG. 15, color correction preferably is not performed on a bottom-most row of data in segment memory I and a bottom-most row of data in segment memory II, because each memory does not contain all data required for color correction of that data. Rather, the uncorrected data is used in color correction of other data in the respective segment memories.

After the color correction has been performed, the segment memories include corrected data for all boundary and non-boundary data. All uncorrected data preferably is trimmed from the segment memories, and the data in segment memory II is vertically transposed, resulting in corrected data 492 and 493.

Figure 16:
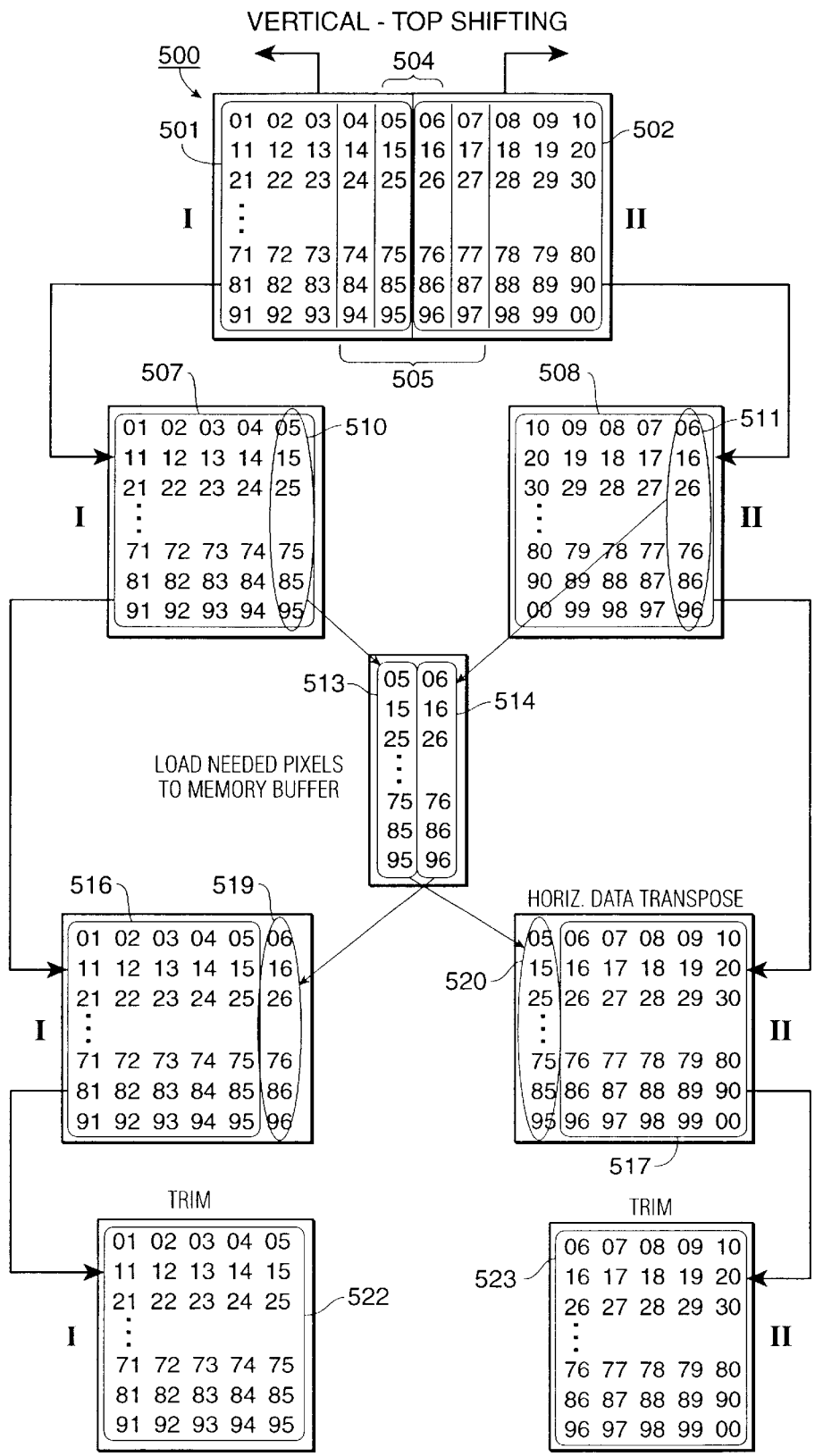

FIG. 16 illustrates buffer and segment memory contents in a case that two sensor segments of an imaging sensor are separated by a vertical boundary, in which data is shifted out of the sensor segments from the top of the sensor.

In FIG. 16, array 500 represents data from two such sensor segments. Data 501 is from a left sensor segment, and data 502 is from a right sensor segment. Data 504 represents boundary data from each of the sensor segments for which color correction is performed based at least in part on data from both sensor segments. Data 505 represents overlap data used to color-correct various parts of boundary data 504.

As shown in FIG. 16, data 501 is shifted to segment memory I as data 507, and data 502 is shifted to segment memory II as data 508. Then, overlap data from each of the segment memories is loaded into a memory buffer according to the invention. Thus, overlap data 510, which corresponds to overlap data 504 in data 501, is loaded into the memory buffer as data 513, and overlap data 511, which corresponds to overlap data 504 in data 502, is loaded into the memory buffer as data 514.

Data from each of the segment memories corresponding to each of the sensor segments is then combined with overlap data from the memory buffer corresponding to adjacent sensor segments. In more detail, data 507 from segment memory I corresponding to sensor segment 501 is combined with overlap data 514 from the memory buffer, and the combined data is stored in segment memory I as data 516 and 519. Likewise, data 508 from segment memory II corresponding to sensor segment 502 is combined with overlap data 513 from the memory buffer, and the combined data is stored in segment memory II as data 517 and 520. The data in segment memory II also is horizontally transposed in the process.

Color correction is performed on the contents of segment memories I and II, preferably in parallel. As shown in FIG. 16, color correction preferably is not performed on a right-most column of data in segment memory I and a left-most column of data in segment memory II, because each memory does not contain all data required for color correction of that data. Rather, the uncorrected data is used in color correction of other data in the respective segment memories.

After the color correction has been performed, the segment memories include corrected data for all boundary and non-boundary data. All uncorrected data preferably is trimmed from the segment memories, resulting in corrected data 522 and 523.

Figure 17:
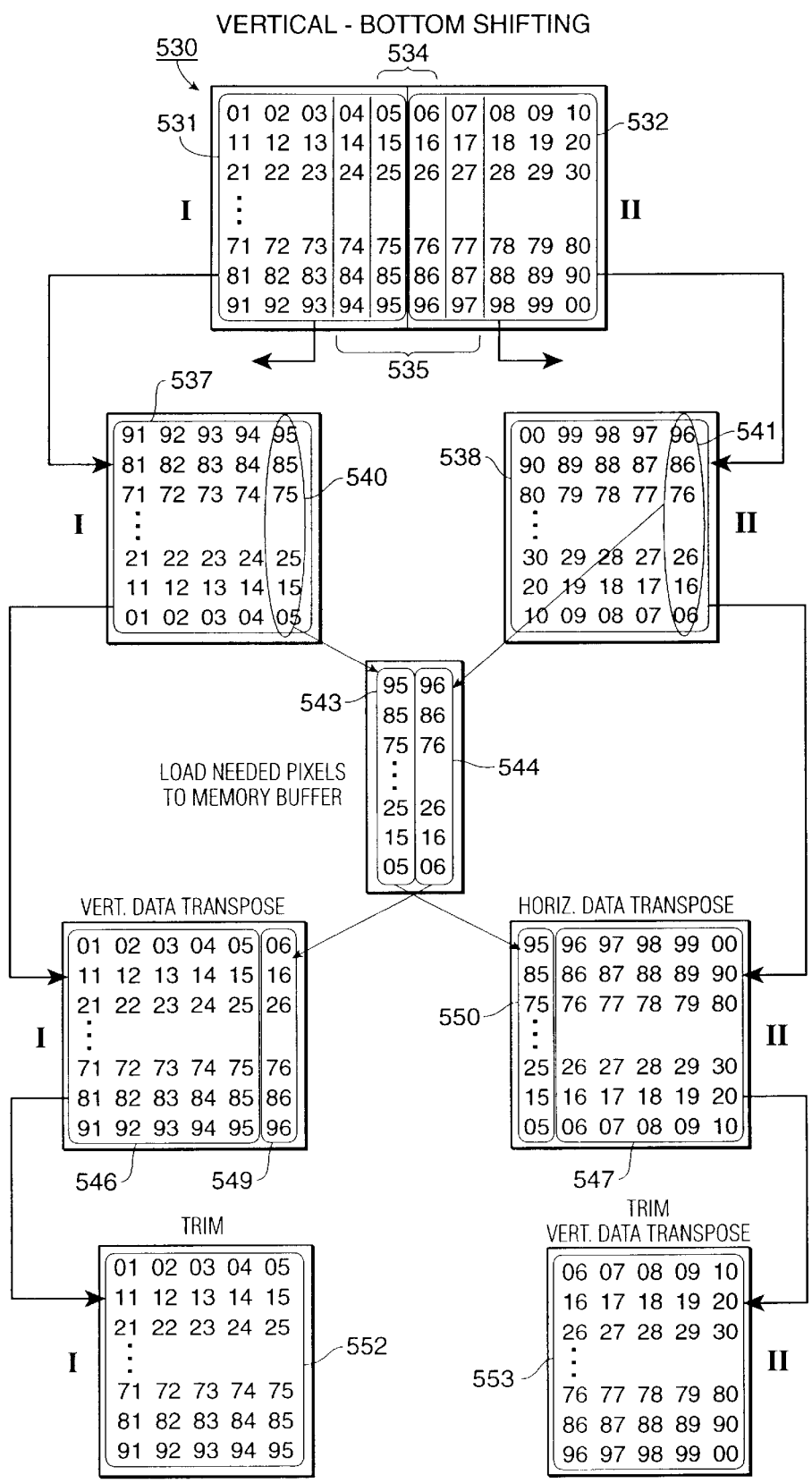

FIG. 17 illustrates buffer and segment memory contents in a case that two sensor segments of an imaging sensor are separated by a vertical boundary, in which data is shifted out of the sensor segments from the bottom of the sensor.

In FIG. 17, array 530 represents data from two such sensor segments. Data 531 is from a left sensor segment, and data 532 is from a right sensor segment. Data 534 represents boundary data from each of the sensor segments for which color correction is performed based at least in part on data from both sensor segments. Data 535 represents overlap data used to color-correct various parts of boundary data 534.

As shown in FIG. 17, data 531 is shifted to segment memory I as data 537, and data 532 is shifted to segment memory II as data 538. Then, overlap data from each of the segment memories is loaded into a memory buffer according to the invention. Thus, overlap data 540, which corresponds to overlap data 534 in data 531, is loaded into the memory buffer as data 543, and overlap data 541, which corresponds to overlap data 534 in data 532, is loaded into the memory buffer as data 544.

Data from each of the segment memories corresponding to each of the sensor segments is then combined with overlap data from the memory buffer corresponding to adjacent sensor segments. In more detail, data 537 from segment memory I corresponding to sensor segment 531 is combined with overlap data 544 from the memory buffer, and the combined data is stored in segment memory I as data 546 and 549. Likewise, data 538 from segment memory II corresponding to sensor segment 532 is combined with overlap data 543 from the memory buffer, and the combined data is stored in segment memory II as data 547 and 550. In addition, the data in segment memory I is vertically transposed, and the data in segment memory II is horizontally transposed in the process.

Color correction is performed on the contents of segment memories I and II, preferably in parallel. As shown in FIG. 17, color correction preferably is not performed on a rightmost column of data in segment memory I and a left-most column of data in segment memory II, because each memory does not contain all data required for color correction of that data. Rather, the uncorrected data is used in color correction of other data in the respective segment memories.

After the color correction has been performed, the segment memories include corrected data for all boundary and non-boundary data. All uncorrected data preferably is trimmed from the segment memories, and the data in segment memory II is vertically transposed, resulting in corrected data 552 and 553.

It should be noted that in the foregoing implementation examples, various transposition operations were performed so as to order the data appropriately. In alternative embodiments, different transpositions can be utilized.

Figure 18:
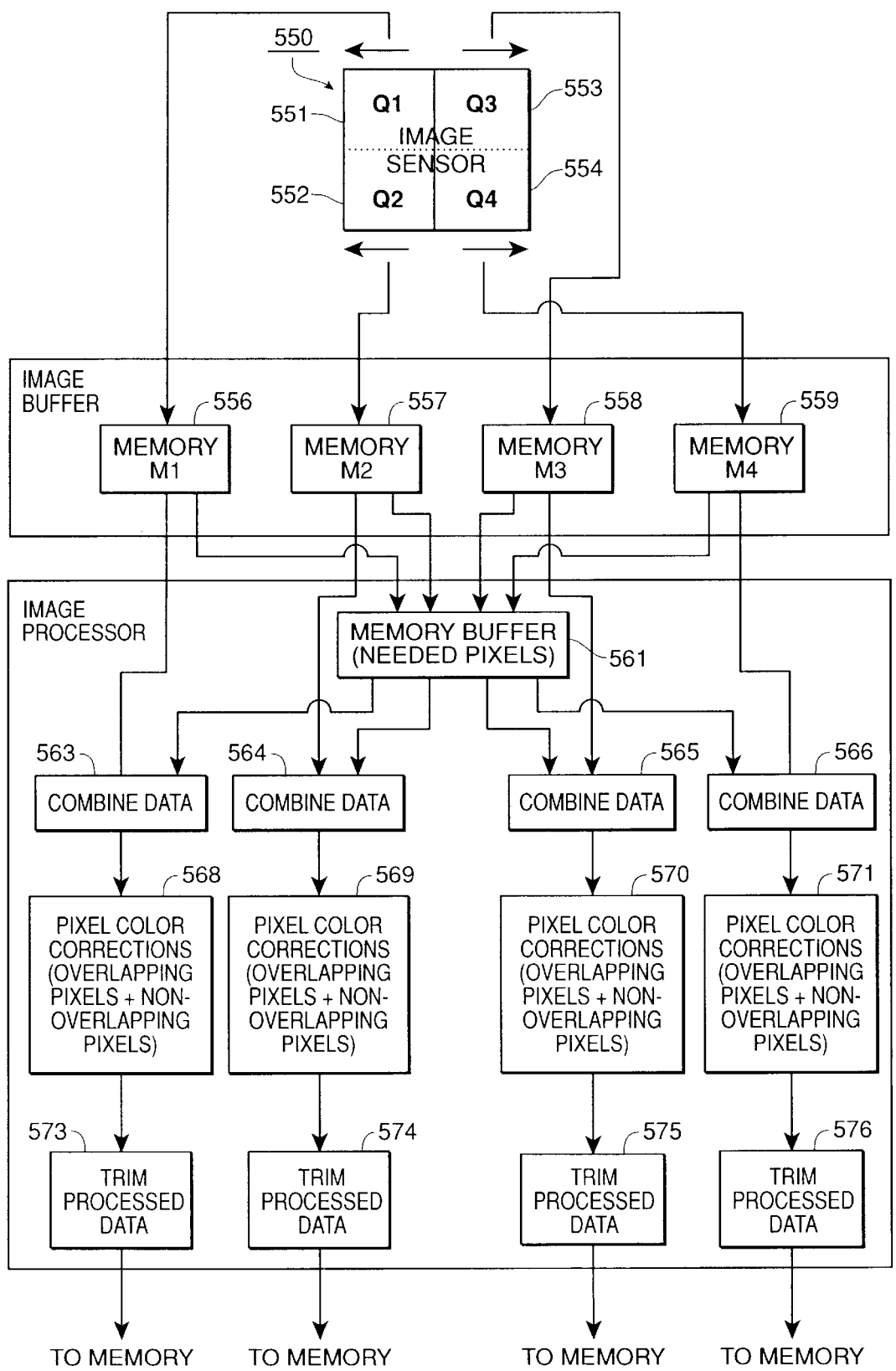
FIG. 18 is a data flow diagram for explaining the third embodiment of a color correction method according to the invention, applied to a four segment sensor.

FIG. 18 is a data flow diagram for explaining the third embodiment of a color correction method according to the invention, applied to a four segment sensor.

In more detail, as shown in FIG. 18, segmented imaging sensor 550 has four sensor segments 551, 552, 553 and 554. Data is shifted from sensor segments 551, 552, 554 and 555 to segment memories M1, M2, M3 and M4, respectively, in blocks 556, 557, 558 and 559.

Data from segment memories M1, M2, M3 and M4 are processed by a media processor according to the invention in blocks 561 through 576. In particular, boundary data from each of the segment memories is loaded into a memory buffer of the media processor in block 561. Then, non-overlap data from each of the segment memories is combined with overlap data from the memory buffer.

In more detail, non-overlap data from segment memory M1 is combined in step 563 with overlap data from the memory buffer corresponding to sensor segments 552, 553 and 554, and the combined data is stored in segment memory M1. Non-overlap data from segment memory M2 is combined in step 564 with overlap data from the memory buffer corresponding to sensor segments 551, 553 and 554, and the combined data is stored in segment memory M2. Non-overlap data from segment memory M3 is combined in step 565 with overlap data from the memory buffer corresponding to sensor segments 551, 552 and 554, and the combined data is stored in segment memory M3. Non-overlap data from segment memory M4 is combined in step 566 with overlap data from the memory buffer corresponding to sensor segments 551, 552 and 553, and the combined data is stored in segment memory M4.

In blocks 568, 569, 570 and 571, color correction is performed on the data in the segment memories. Block 568 performs color correction on the combined data from block 563 so as to color-correct all data corresponding to sensor segment 551. Block 569 performs color correction on the combined data from block 564 so as to color-correct all data corresponding to sensor segment 552. Block 570 performs color correction on the combined data from block 565 so as to color-correct all data corresponding to sensor segment 553. Block 571 performs color correction on the combined data from block 566 so as to color-correct all data corresponding to sensor segment 554.

In blocks 573, 574, 575 and 576, data is trimmed from the segment memories. In block 573, all data which does not correspond to sensor segment 551 is trimmed from sensor memory M1. In block 574, all data which does not correspond to sensor segment 552 is trimmed from sensor memory M2. In block 575, all data which does not correspond to sensor segment 553 is trimmed from sensor memory M3. In block 576, all data which does not correspond to sensor segment 554 is trimmed from sensor memory M4. After blocks 573, 574, 575 and 576, each segment memory preferably contains color-corrected data corresponding to its respective sensor segment.

FOURTH EMBODIMENT OF A COLOR CORRECTION METHOD

Figure 19:
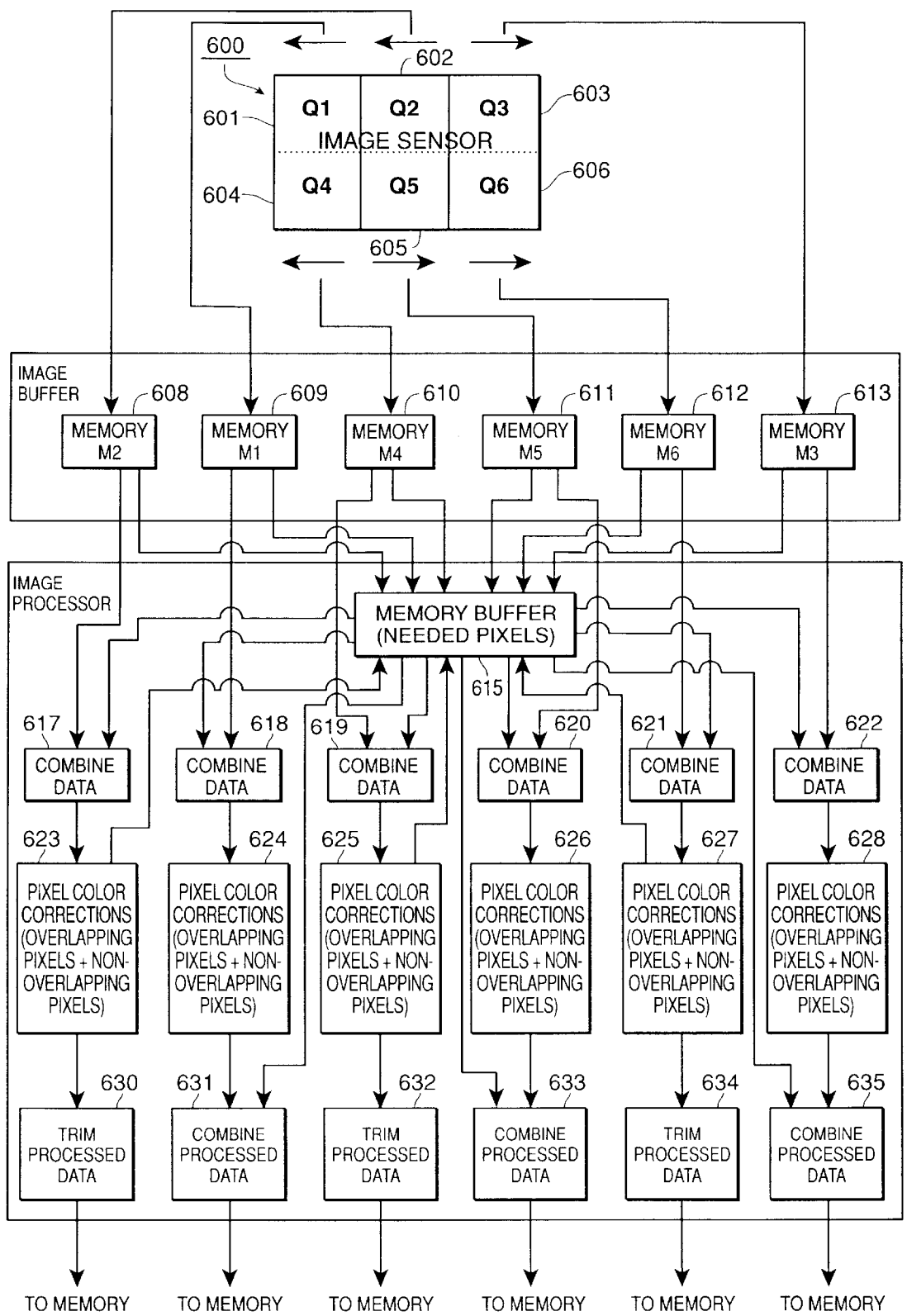
FIG. 19 is a data flow diagram for explaining a fourth embodiment of a color correction method according to the invention, applied to a six segment sensor.

FIG. 19 is a data flow diagram for explaining a fourth embodiment of a color correction method according to the invention, applied to a six segment sensor. The fourth embodiment is similar to the second embodiment, with minor modifications so as to adapt the second embodiment to a sensor with six sensor segments.

In more detail, as shown in FIG. 19, segmented imaging sensor 600 has six sensor segments 601, 602, 603, 604, 605 and 606. Data is shifted from sensor segments 601, 602, 603, 604, 605 and 606 to segment memories M1, M2, M3, M4, M5 and M6, respectively, in blocks 609, 608, 613, 610, 611 and 612.

Data from segment memories M1, M2, M3, M4, M5 and M6 are processed by a media processor according to the invention in blocks 615 through 635. In particular, boundary data from all of the segment memories (M1, M2, M3, M4, M5 and M6) and non-boundary overlap data from a first half of the segment memories (M1, M3 and M5) are loaded into a memory buffer of the media processor in block 615. This data is then combined with data from all of the segment memories in blocks 617, 618, 619, 620, 621 and 622. The combined data is stored in the segment memories.

In blocks 623, 624, 625, 626, 627 and 628, color correction is performed on the combined data. Preferably, at least some of blocks 623, 624, 625, 626, 627 and 628 are performed in parallel by separate processing clusters in the media processor. Even more preferably, all six blocks are performed in parallel by six processing clusters.

Corrected boundary data from blocks 623, 625 and 627 that corresponds to boundary data for sensor segments 601, 603 and 605 is loaded back into the memory buffer. In blocks 631, 633 and 635, this corrected data is combined with corrected data from blocks 624, 626 and 628. The outputs of blocks 631, 633 and 635 are color-corrected data for sensor segments 601, 605 and 603, respectively.

Likewise, the outputs of blocks 623, 625 and 627 are trimmed so as to remove data which does not correspond to sensor segments 602, 604 and 606. These trimming operations occur in blocks 630, 632 and 634, the outputs of which are color-corrected data for sensor segments 602, 604 and 606, respectively.

Figure 20A:
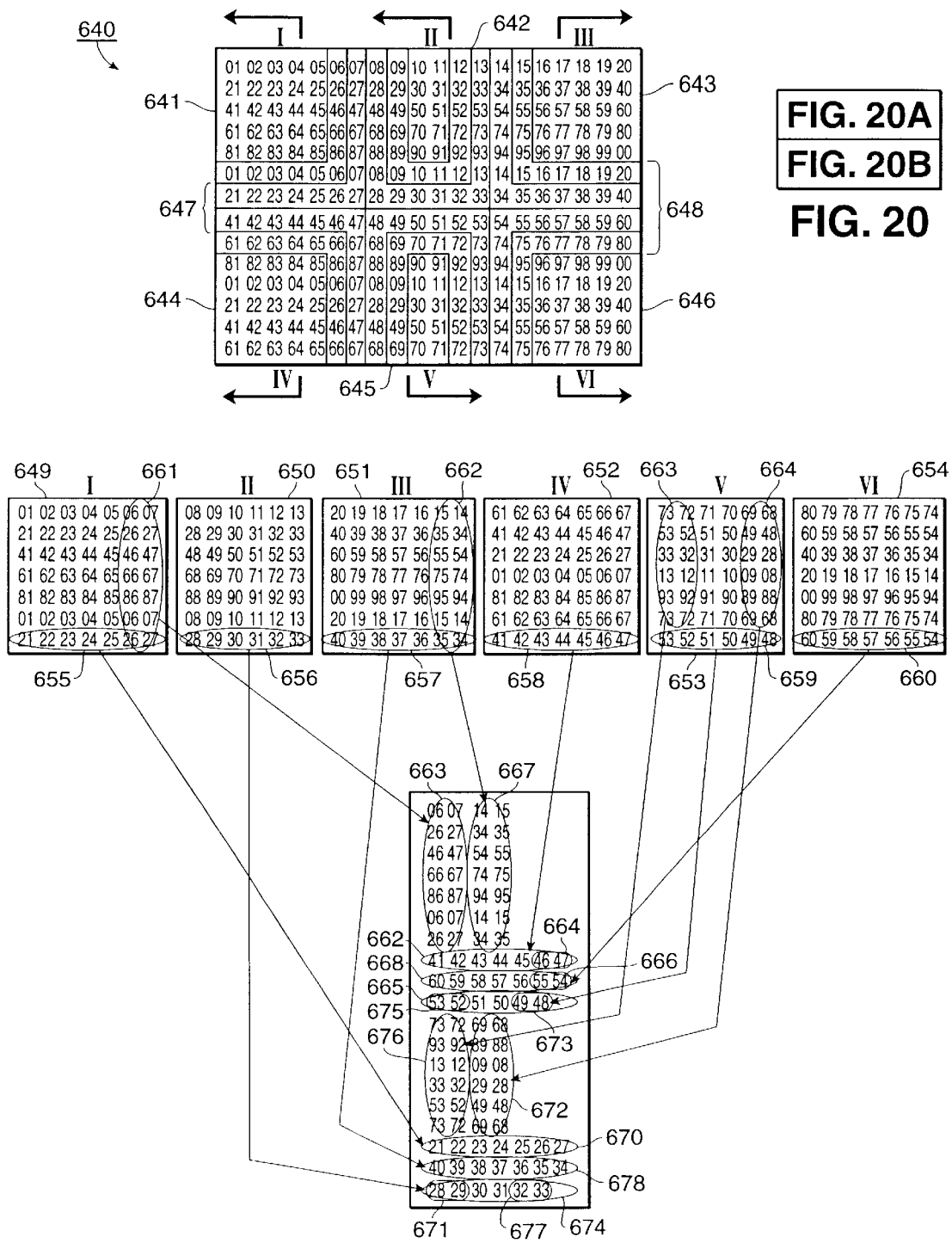
FIG. 20 is an illustration of segment and buffer memory contents for an implementation of the embodiment shown in FIG. 19.
Figure 20B:
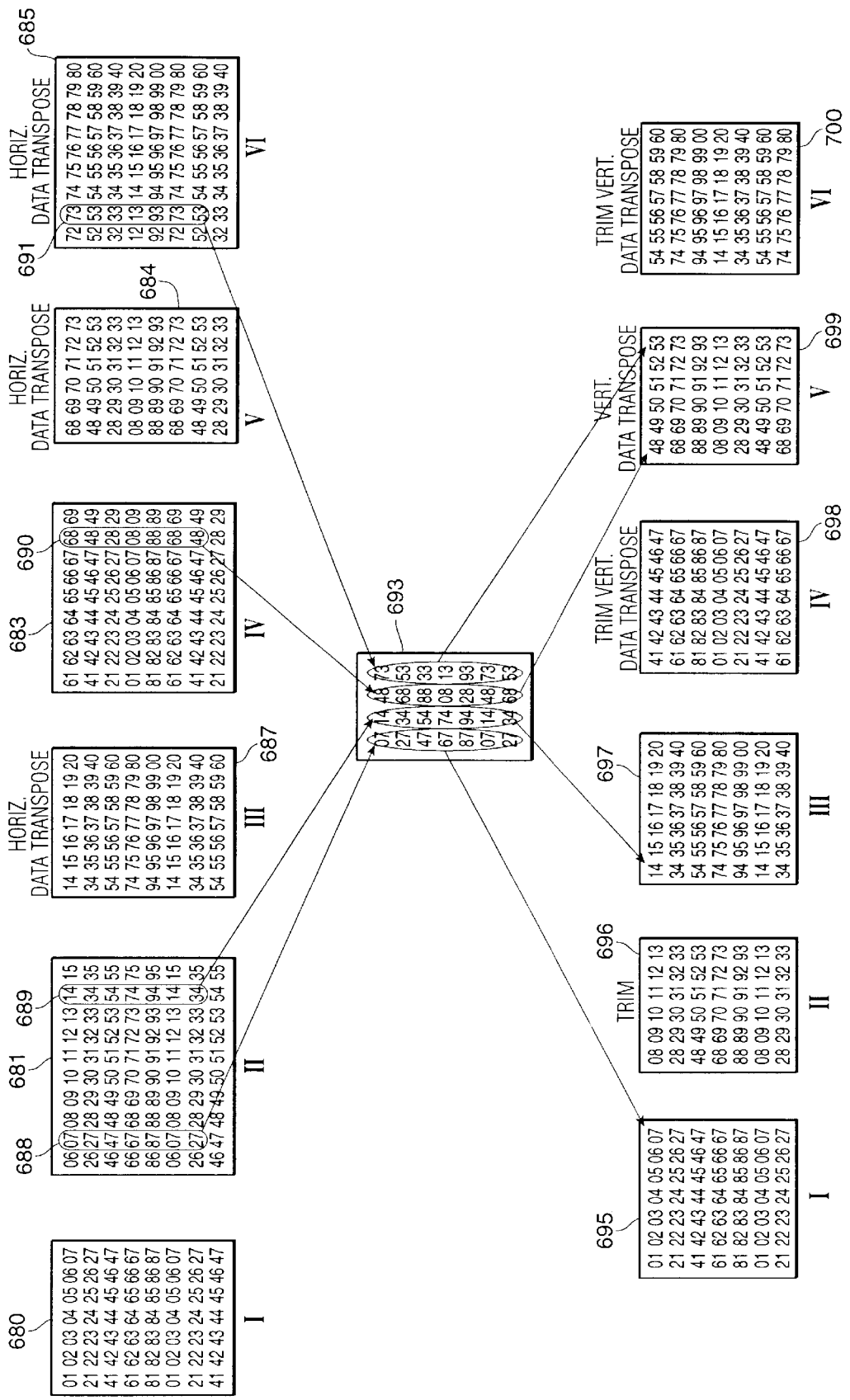

FIG. 20 is an illustration of segment and buffer memory contents for an implementation of the embodiment shown in FIG. 19. FIG. 20 is divided into FIGS. 20A and 20B for cosmetic reasons In these figures, bold-faced data positions indicate data which has been data processed, such as by color correction.

In FIG. 20A, array 640 represents data from six sensor segments of an image sensor. Data 641 is from a top left sensor segment, data 642 is from a top middle sensor segment, data 643 is from a top right sensor segment, data 644 is from a bottom left sensor segment, data 645 is from a bottom middle sensor segment, and data 646 is from a bottom right sensor segment.

Data 647 represents boundary data from each of the sensor segments for which color correction is performed based at least in part on data from both sensor segments. Data 648 represents overlap data used to color-correct various parts of boundary data 647.

As shown in FIG. 20A, data 641 is shifted to segment memory I, data 642 is shifted to segment memory II, data 643 is shifted to segment memory III, data 644 is shifted to segment memory IV, data 645 is shifted to segment memory V, and data 646 is shifted to segment memory IV. Then, boundary data from all of the segment memories and non-boundary overlap data from a first half (i.e., three) of the segment memories are loaded into a memory buffer of a media processor according to the invention.

In more detail, boundary data 655 from segment memory I, boundary data 656 from segment memory II, boundary data 657 from segment memory III, boundary data 658 from segment memory IV, boundary data 659 from segment memory V, and boundary data 660 from segment memory VI are loaded into the memory buffer. In addition, data 661 from segment memory I, data 662 from segment memory III, and data 663 and 664 from segment memory V are loaded into the memory buffer. Data 661, 662, 663 and 664 correspond to overlap data 648 from data 641, 643 and 645. As shown in FIG. 20A, this overlap data includes non-boundary data.

Next, data needed for color correction of boundary data is combined with data from each of the segment memories, preferably as set forth below.

Data 641 from segment memory I is combined with data 662 from the memory buffer. Data 662 corresponds to overlap data from data 644. This combined data preferably is stored in segment memory I.

Data 642 from segment memory II is combined with data 663, 664, 665, 666 and 667 from the memory buffer. Data 663 corresponds to overlap data (including boundary and non-boundary data) from data 641; data 664 corresponds to boundary data from data 644; data 665 corresponds to boundary data from data 645; data 666 corresponds to boundary data from data 646; and data 667 corresponds to overlap (including boundary and non-boundary data) from data 643. This combined data preferably is stored in segment memory II.

Data 643 from segment memory III is combined with data 668 from the memory buffer. Data 668 corresponds to boundary data from data 646. This combined data preferably is horizontally transposed and stored in segment memory III.

Data 644 from segment memory IV is combined with data 670, 671, 672 and 673 from the memory buffer. Data 670 corresponds to boundary data from data 641; data 671 corresponds to boundary data from data 642; and data 672 corresponds to overlap data (including boundary and non-boundary data) from data 645. Data 673 corresponds to boundary data from data 645. This combined data is stored in segment memory IV.

Data 645 from segment memory V is combined with data 674 from the memory buffer. Data 674 corresponds to boundary data from data 642. This combined data preferably is horizontally transposed and stored in segment memory V.

Data 646 from segment memory VI is combined with data 675, 676, 677 and 678 from the memory buffer. Data 676 corresponds to overlap data (including boundary and non-boundary data) from data 645; data 677 corresponds to boundary data from data 642; and data 678 corresponds to boundary data from data 643. Data 675 corresponds to boundary data from data 645. This combined data preferably is horizontally transposed and stored in segment memory VI.

The results of the foregoing combination and transposition operations are depicted at the top of FIG. 20B at 680, 681, 682, 683, 684 and 685.

Color correction is then performed on the contents of segment memories I, II, III, IV, V and VI, preferably in parallel. As shown in FIG. 20B, color correction preferably is not performed on certain portions of the data, which is instead used to color-correct adjacent boundary data.

After the color correction has been performed, the segment memories include corrected data for all boundary and non-boundary data. Next, color-corrected boundary data 688, 689, 690 and 691 are loaded back into the memory buffer.

The color-corrected data in the memory buffer is used to replace uncorrected boundary data in for segment memories I, III and V. Then, uncorrected data is trimmed from the segment memories, and data in segment memories IV, V and VI is vertically transposed. After these operations, data 695, 696, 697, 698, 699 and 700 contain color-corrected data corresponding to each of data 641, 642, 643, 644, 645 and 646, respectively.

It should be noted that various details of the foregoing implementation example, such as the timing of the data transposition, can be varied without departing from the scope of the fourth embodiment.

CONCLUSION

By virtue of the foregoing arrangements, color correction which alleviates discontinuities in data from segmented image sensors can be performed efficiently. The use of processing clusters in parallel enhances this efficient color correction.

While the invention is described above with respect to what is currently considered its preferred embodiments, it is to be understood that the invention is not limited to that described above. For example, boundary data and overlap data are depicted in FIGS. 3 to 20 as extending one data value and two data values, respectively, into data for each sensor segment of an imaging sensor. However, the invention is equally applicable to differently-sized boundary and overlap data that extend further into the data for each segment. Accordingly, the invention is intended to cover various modifications and equivalent arrangements included within the spirit and scope of the appended claims.

What is claimed is:

1. A method for color-correcting data from a segmented imaging sensor having plural sensor segments, the data stored in plural segment memories each of which corresponds to one of the sensor segments, each segment memory storing overlap data and non-overlap data from the corresponding sensor segment, the overlap data in each segment memory including boundary data from a boundary region of the sensor segment for which color correction is performed based at least in part on data from a segment memory for an adjacent sensor segment, the overlap data further including other data from the segment memory used to color-correct the boundary data, the method comprising the steps of:

loading overlap data from at least a first half of the segment memories into a memory buffer;

combining overlap data from the memory buffer with data from a second half of the segment memories; and performing color correction of boundary data, based on the combined data, and of non-boundary data for each of the segment memories.

2. A method according to claim 1, further comprising the steps of:

loading color-corrected boundary data back into the memory buffer; and combining color-corrected non-boundary data from the first half of the segment memories with color-corrected boundary data from the memory buffer.

3. A method according to claim 2, further comprising the step of outputting color-corrected boundary data and non-boundary data from each of the segment memories.

4. A method according to claim 1, wherein the step of performing color correction is performed in parallel for plural segment memories.

5. A method according to claim 1, wherein a number of segment memories is two, a number of segment memories in the first half of segment memories is one, and a number of segment memories in the second half of segment memories is one.

6. A method according to claim 1, wherein a number of segment memories is four, a number of segment memories in the first half of segment memories is two, and a number of segment memories in the second half of segment memories is two.

7. A method according to claim 1, wherein a number of segment memories is six, a number of segment memories in the first half of segment memories is three, and a number of segment memories in the second half of segment memories is three.

8. A method for color-correcting data from a segmented imaging sensor having plural sensor segments, the data stored in plural segment memories each of which corresponds to one of the sensor segments, each segment memory storing overlap data and non-overlap data from the corresponding sensor segment, the overlap data in each segment memory including boundary data from a boundary region of the sensor segment for which color correction is performed based at least in part on data from a segment memory for an adjacent sensor segment, the overlap data further including other data from the segment memory used to color-correct the boundary data, the method comprising the steps of:

loading boundary data from all of the segment memories and non-boundary overlap data from a first half of the segment memories into a memory buffer;

combining boundary data from the memory buffer with data from each of the segment memories, and combining non-boundary overlap data from the memory buffer with data from a second half of the segment memories; and performing color correction of boundary data, based on the combined data, and of non-boundary data for each of the segment memories.

9. A method according to claim 8, further comprising the steps of:

loading color-corrected boundary data back into the memory buffer; and combining color-corrected non-boundary data from the segment memories with color-corrected boundary data from the memory buffer.

10. A method according to claim 9, further comprising the step of outputting color-corrected boundary data and non-boundary data from each of the segment memories.

11. A method according to claim 8, wherein the step of performing color correction is performed in parallel for plural segment memories.

12. A method according to claim 8, wherein a number of segment memories is two, a number of segment memories in the first half of segment memories is one, and a number of segment memories in the second half of segment memories is one.

13. A method according to claim 8, wherein a number of segment memories is four, a number of segment memories in the first half of segment memories is two, and a number of segment memories in the second half of segment memories is two.

14. A method according to claim 8, wherein a number of segment memories is six, a number of segment memories in the first half of segment memories is three, and a number of segment memories in the second half of segment memories is three.

15. A method for color-correcting data from a segmented imaging sensor having plural sensor segments, the data stored in plural segment memories each of which corresponds to one of the sensor segments, each segment memory storing overlap data and non-overlap data from the corresponding sensor segment, the overlap data in each segment memory including boundary data from a boundary region of the sensor segment for which color correction is performed based at least in part on data from a segment memory for an adjacent sensor segment, the overlap data further including other data from the segment memory used to color-correct the boundary data, the method comprising the steps of:

loading boundary data from all of the segment memories into the memory buffer;

combining data from the memory buffer with data from each of the segment memories; and performing color correction of boundary data, based on the combined data, and of non-boundary data for each of the segment memories.

16. A method according to claim 15, further comprising the step of trimming away non-corrected data.

17. A method according to claim 16, further comprising the step of outputting color-corrected boundary data and non-boundary data from each of the segment memories.

18. A method according to claim 15, wherein the step of performing color correction is performed in parallel for plural segment memories.

19. A method according to claim 15, wherein a number of segment memories is two.

20. A method according to claim 15, wherein a number of segment memories is four.

21. A method according to claim 15, wherein a number of segment memories is six.

22. A media processor for color-correcting data from a segmented imaging sensor having plural sensor segments, the data stored in plural segment memories each of which corresponds to one of the sensor segments, each segment memory storing overlap data and non-overlap data from the corresponding sensor segment, the overlap data in each segment memory including boundary data from a boundary region of the sensor segment for which color correction is performed based at least in part on data from a segment memory for an adjacent sensor segment, the overlap data further including other data from the segment memory used to color-correct the boundary data, the media processor comprising:

an interface to data from the plural segment memories;

a memory buffer for storing boundary or other overlap data from at least one of the segment memories;

a data transfer controller for direct memory access to the memory buffer;

at least one processing cluster for performing color correction on data; and control logic.

23. A media processor according to claim 22, wherein the segment memories are on separate chips from the media processor.

24. A media processor according to claim 22, wherein the segment memories are on a single chip with the media processor.

25. A media processor according to claim 22, further comprising an interface to an image memory for storing color-corrected image data for all of the sensor segments.

26. A media processor according to claim 22, wherein the media processor further comprises at least a second processing cluster for performing color correction on data.

27. A media processor according to claim 26, wherein each processing cluster is capable of processing very long instruction word commands.

28. A media processor according to claim 22, wherein the control logic comprises a programmable device programmed with executable process steps for performing the color correction.

29. A media processor according to claim 22, wherein the control logic comprises hard-wired control circuitry for performing the color correction.

30. A media processor according to claim 22, wherein the control logic controls the media processor to perform the steps of:

loading overlap data from at least a first half of the segment memories into a memory buffer;

combining overlap data from the memory buffer with data from a second half of the segment memories; and performing color correction of boundary data, based on the combined data, and of non-boundary data for each of the segment memories.

31. A media processor according to claim 30, wherein the control logic further controls the media processor to perform the steps of:

loading color-corrected boundary data back into the memory buffer; and combining color-corrected non-boundary data from the first half of the segment memories with color-corrected boundary data from the memory buffer.

32. A media processor according to claim 22, wherein the control logic controls the media processor to perform the steps of:

loading boundary data from all of the segment memories and non-boundary overlap data from a first half of the segment memories into a memory buffer;

combining boundary data from the memory buffer with data from each of the segment memories, and combining non-boundary overlap data from the memory buffer with data from a second half of the segment memories; and performing color correction of boundary data, based on the combined data, and of non-boundary data for each of the segment memories.

33. A media processor according to claim 32, wherein the control logic further controls the media processor to perform the steps of:

loading color-corrected boundary data back into the memory buffer; and combining color-corrected non-boundary data from the segment memories with color-corrected boundary data from the memory buffer.

34. A media processor according to claim 22, wherein the control logic controls the media processor to perform the steps of:

loading boundary data from all of the segment memories into the memory buffer;

combining data from the memory buffer with data from each of the segment memories; and performing color correction of boundary data, based on the combined data, and of non-boundary data for each of the segment memories.

35. A media processor according to claim 34, wherein the control logic further controls the media processor to perform the step of trimming away non-corrected data.

* * * * *